United States Patent [19]

Seki et al.

[11] Patent Number: 5,033,290
[45] Date of Patent: Jul. 23, 1991

[54] METHOD OF DETECTING FAILURE OF A VALVE TIMING CHANGEOVER CONTROL SYSTEM OF AN INTERNAL COMBUSTION ENGINE

[75] Inventors: Yasunari Seki; Kiyoshi Tsukimura; Yosuke Tachibana; Isao Yahata, all of Wako, Japan

[73] Assignee: Honda Giken Kogyo Kabushiki Kaisha, Tokyo, Japan

[21] Appl. No.: 529,965

[22] Filed: May 24, 1990

[30] Foreign Application Priority Data

May 25, 1989 [JP] Japan ................................ 1-132129
Jun. 1, 1989 [JP] Japan ................................ 1-139696

[51] Int. Cl.$^5$ ........................................... G01M 15/00
[52] U.S. Cl. ................................................. 73/118.1
[58] Field of Search ..................... 73/118.1, 115, 118.2

[56] References Cited

U.S. PATENT DOCUMENTS 4,957,074  9/1990  Weissler, II et al. .......... 73/118.1 X

FOREIGN PATENT DOCUMENTS 2102310 of 0000 Japan .
49-33289 of 0000 Japan .

Primary Examiner—Jerry W. Myracle
Attorney, Agent, or Firm—Lyon & Lyon

[57] ABSTRACT

Failure of a valve timing changeover control system of an internal combustion engine is detected by the steps of: (1) setting a predetermined state of intake air to be supplied to the engine depending on a control signal for controlling changeover of valve timing, (2) detecting a state of intake air being supplied to the engine, (3) comparing the detected state of intake air with the set predetermined state of intake air, and (4) detecting from the result of the combustion whether or not there is failure in the valve timing changeover control system.

15 Claims, 19 Drawing Sheets

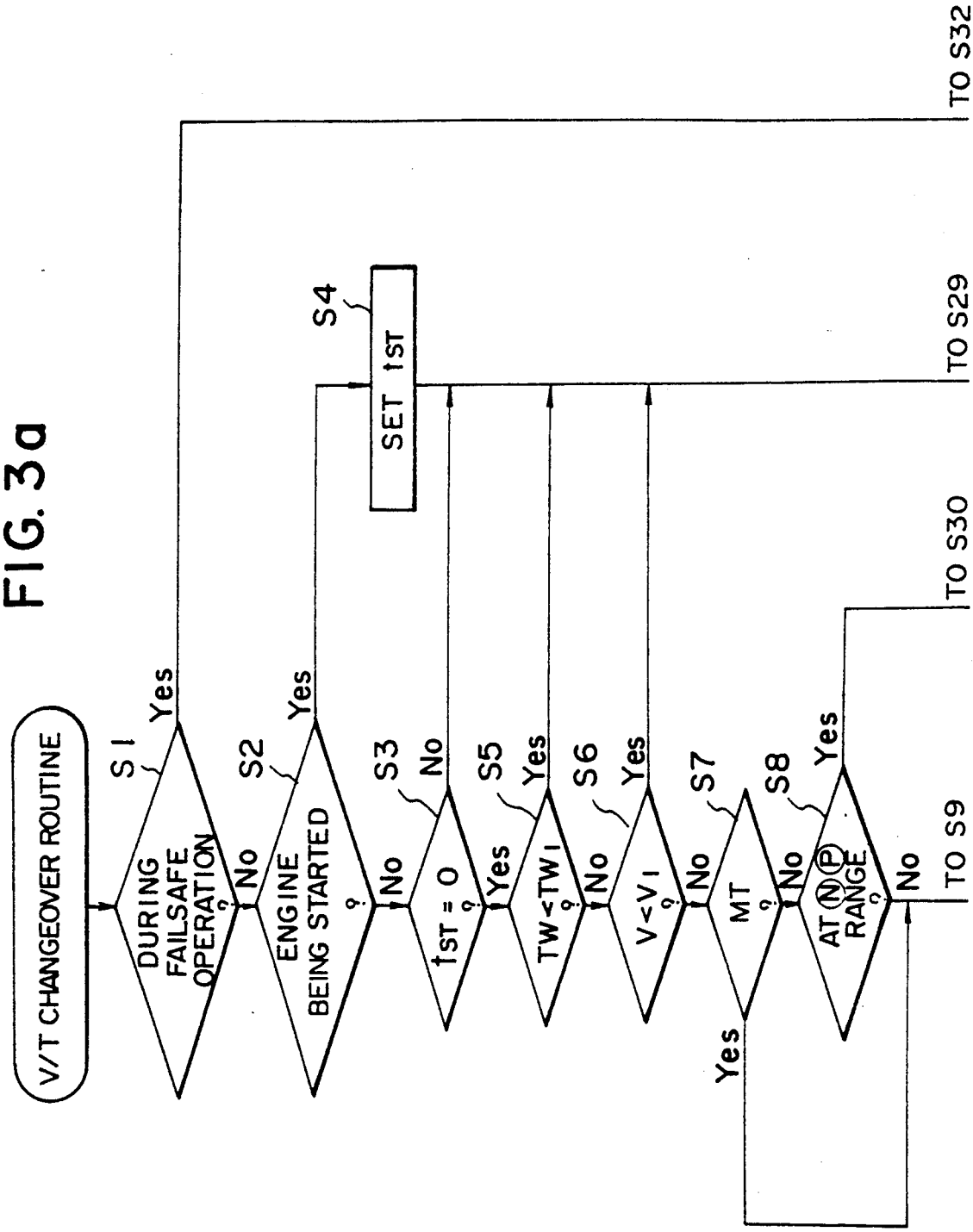

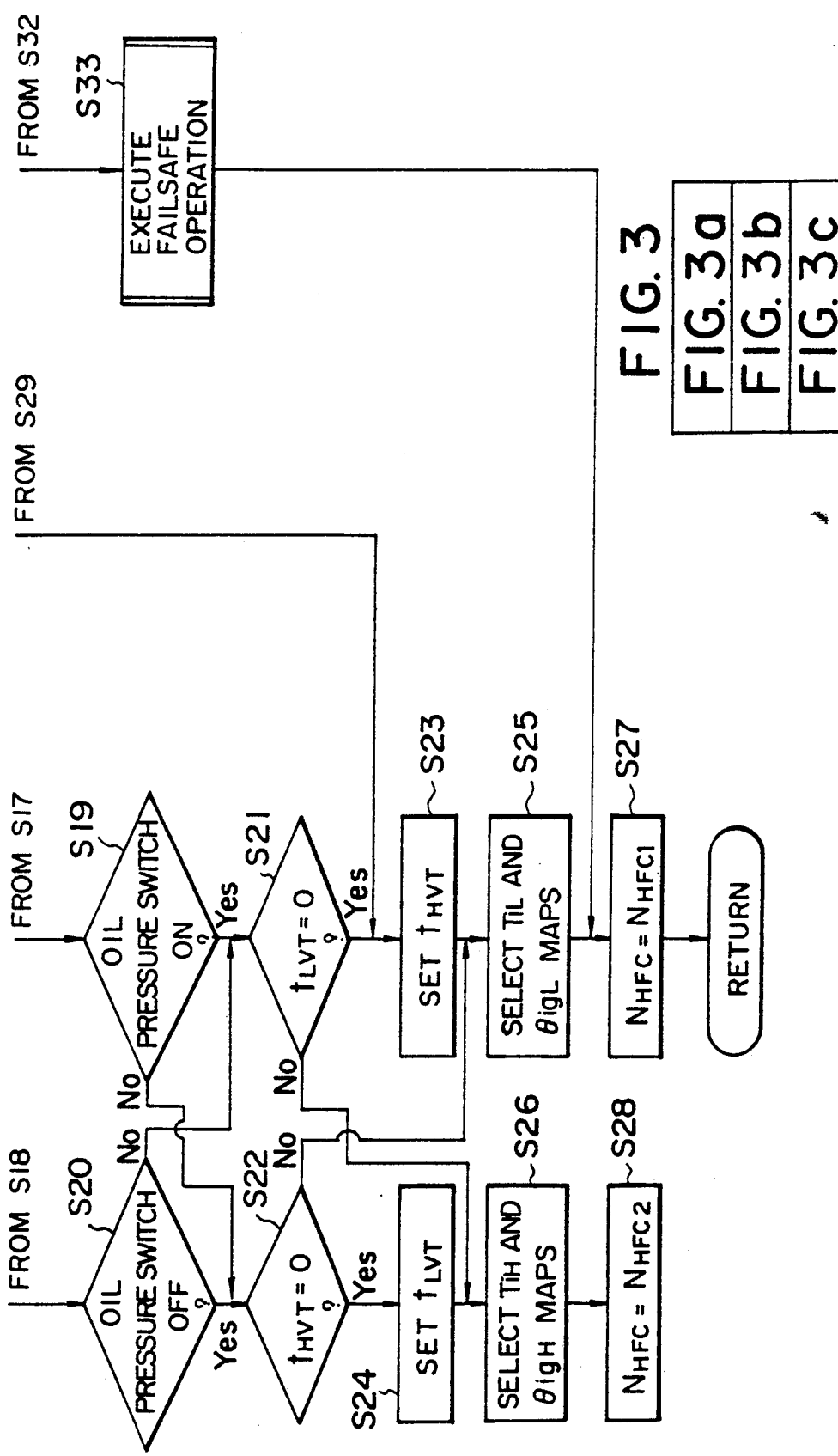

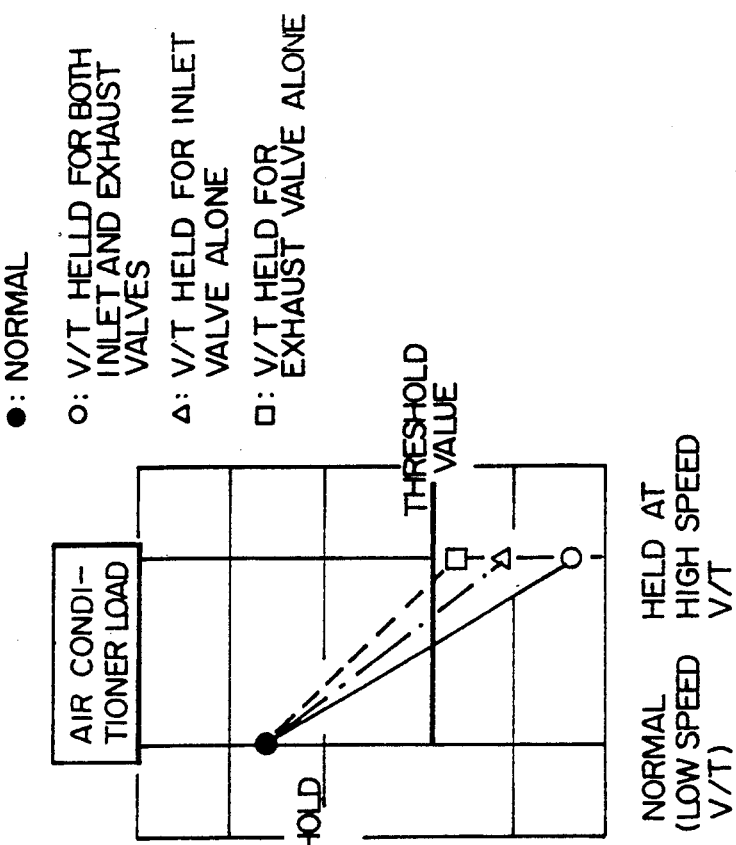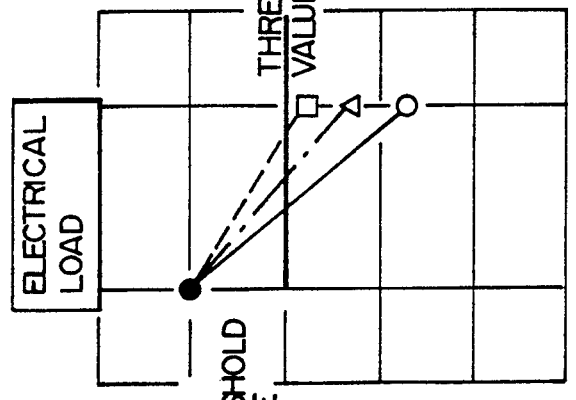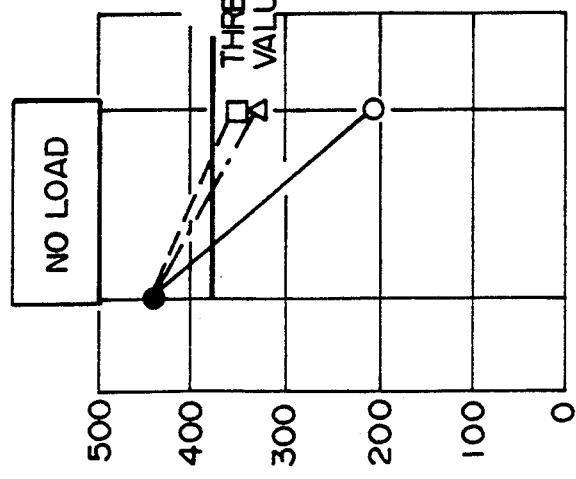

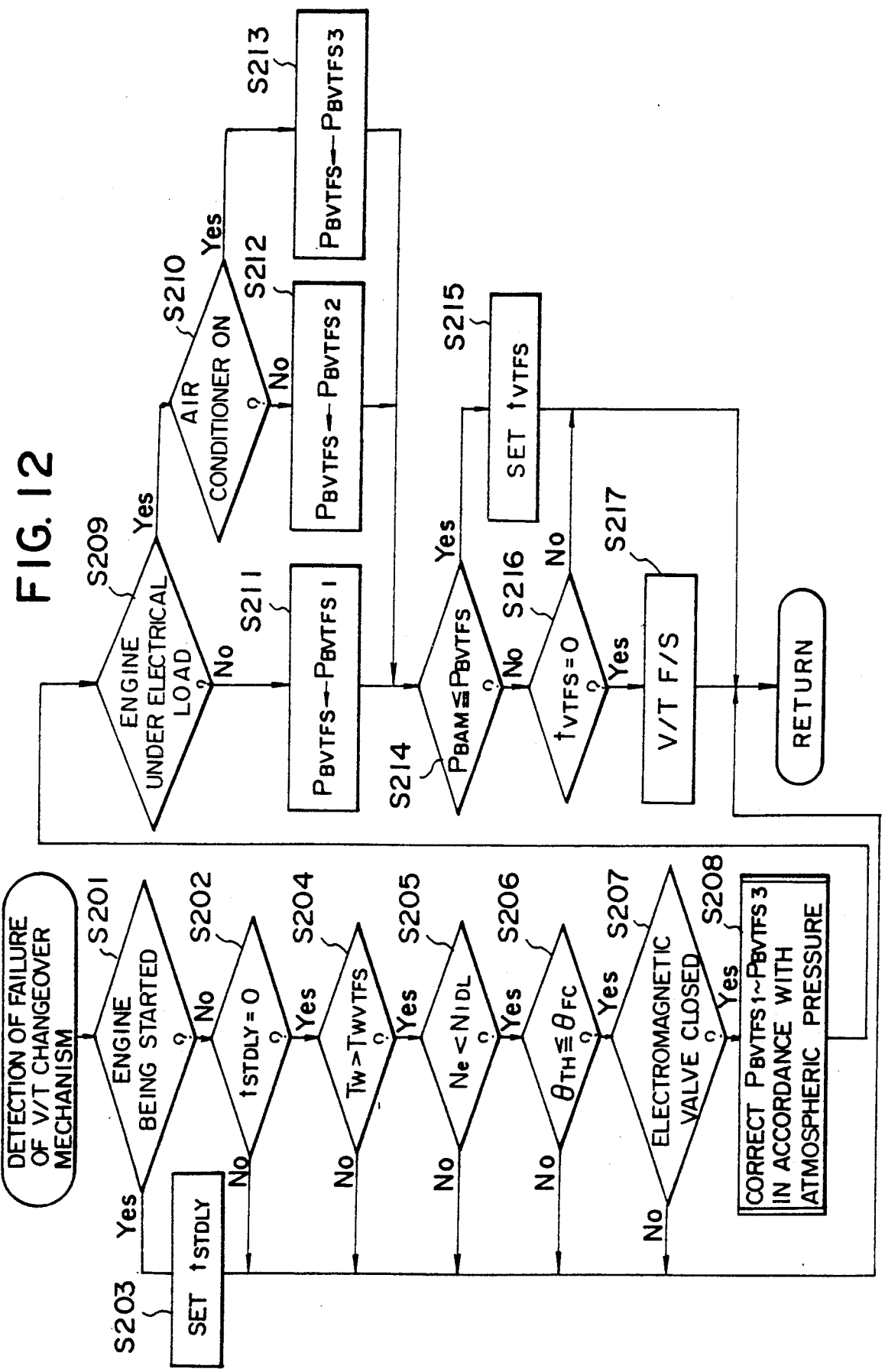

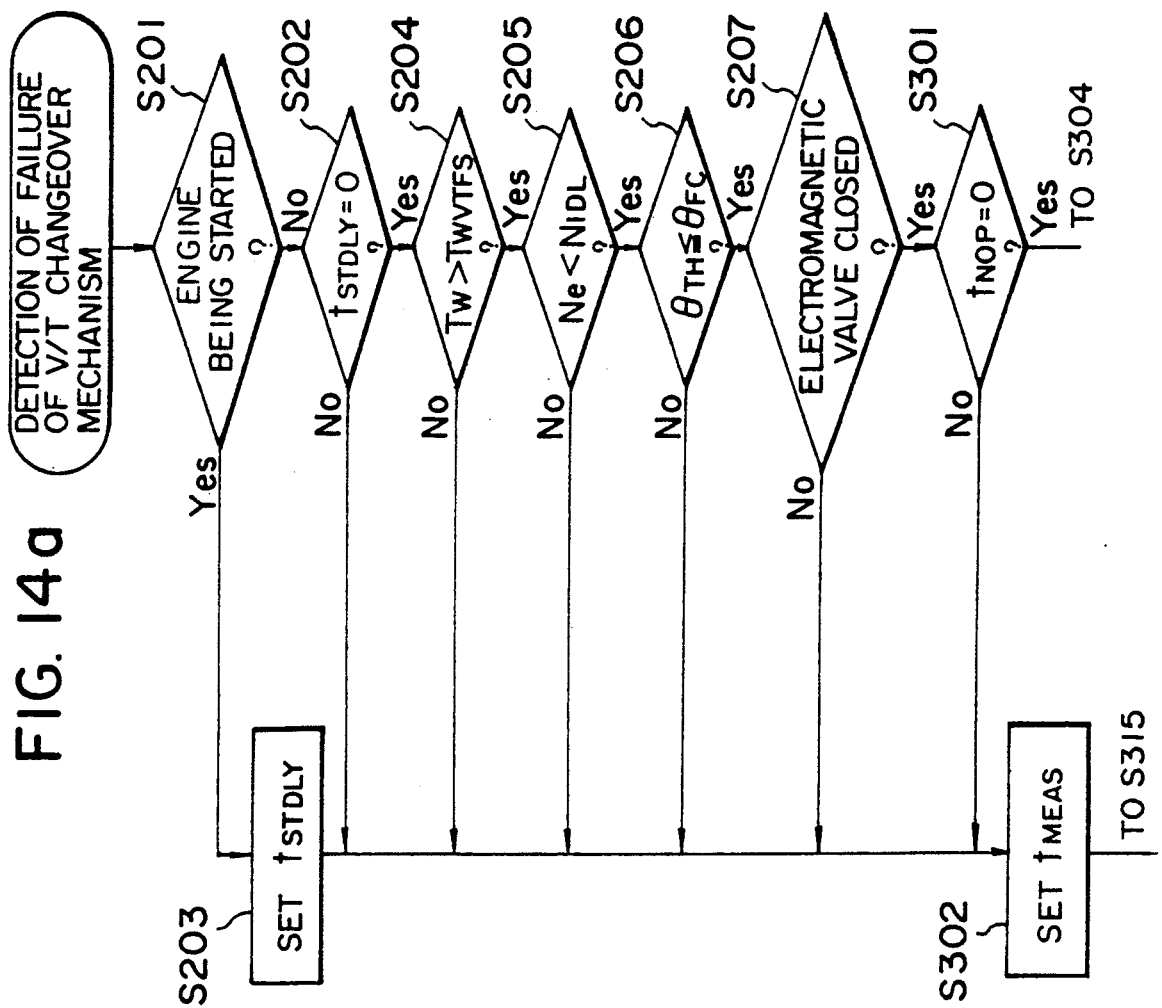

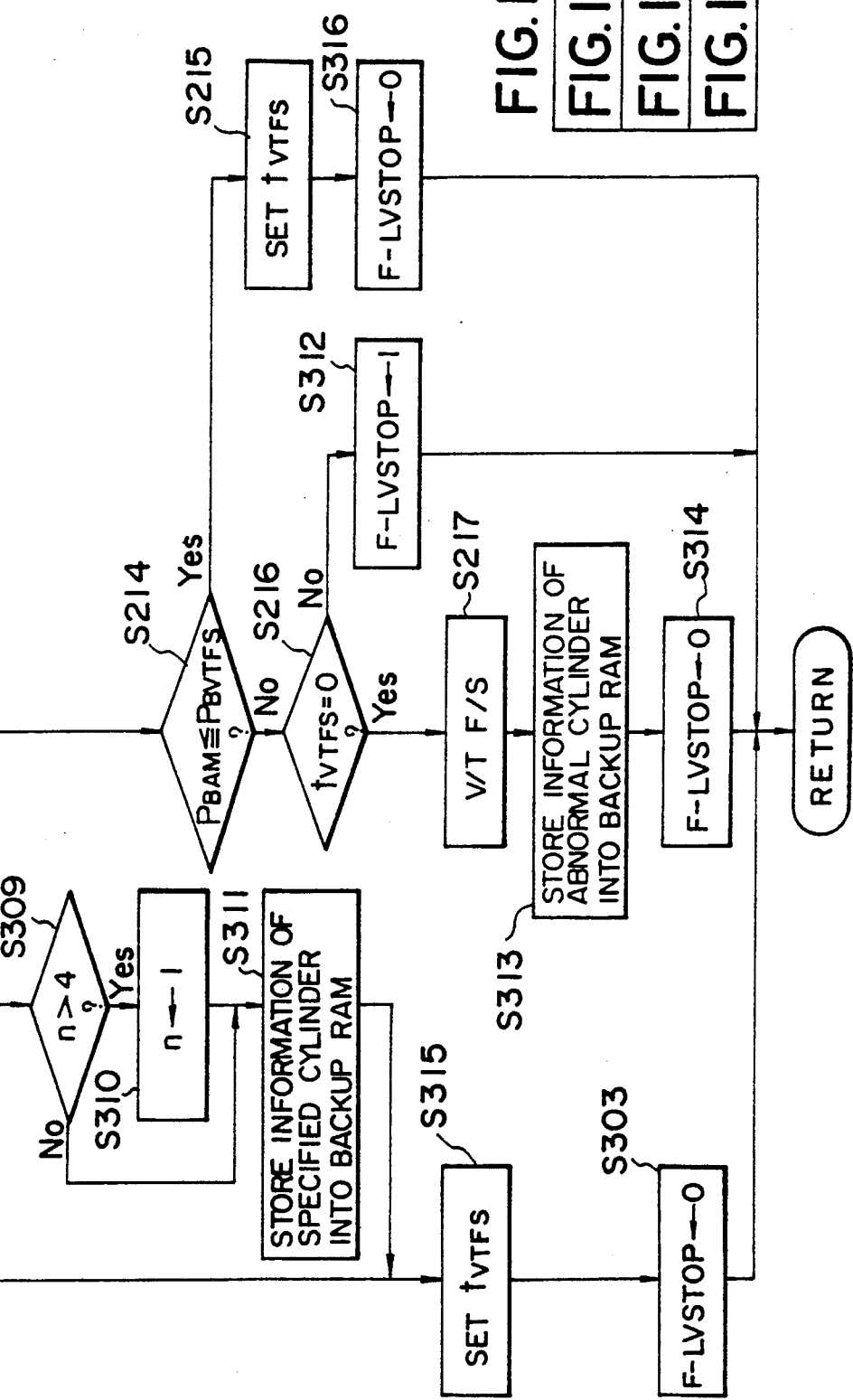

METHOD OF DETECTING FAILURE OF A VALVE TIMING CHANGEOVER CONTROL SYSTEM OF AN INTERNAL COMBUSTION ENGINE

BACKGROUND OF THE INVENTION

This invention relates to a method of detecting failure of a valve timing changeover mechanism in a valve timing changeover control system of an internal combustion engine which changes the valve timing of inlet and/or exhaust valves.

It is conventionally known e.g. from Japanese Patent Publication (Kokoku) No. 49-33289 to provide a valve timing changeover mechanism which changes the valve timing of inlet and exhaust valves of an internal combustion engine, in response to an instruction signal from a control unit depending on operating conditions of the engine. (Throughout the specification and claims, "the changeover of valve timing" means changeover of a valve lift amount alone, or changeover of both the valve lift amount and at least one of the valve opening period and the valve opening angle. Further, "the changeover of valve timing" includes inhibiting operation of one of a plurality of inlet or exhaust valves provided for each cylinder of the engine in a specific operating region of the engine.)

In such an engine capable of changing the valve timing, if the valve timing changeover mechanism becomes faulty, there can be a case in which even if the control unit outputs an instruction signal for changeover of the valve timing, the valve timing is not actually changed in spite of the instruction signal. In such a case, other controls (fuel supply control, ignition timing control, etc.) which are carried out in accordance with the valve timing controlled in response to the instruction signal are not carried out in manners suitable for the actually selected valve timing, which results in degraded performance of the engine such as degraded driveability. In order to solve this problem, a failure detecting device for detecting failure of a valve timing changeover mechanism has already been proposed in Japanese Provisional Patent Publication (Kokai) No. 2-102310 by the present assignee.

The proposed failure detecting device is adapted to detect failure of a valve timing changeover mechanism which comprises first and second cams having profiles different from each other, and first and second rocker arms on which the first and second cams slide, respectively. The cams for driving inlet and exhaust valves are changed over between the first and the second cams to thereby change the valve timing between low speed valve timing suitable for a lower engine rotational speed range and high speed valve timing suitable for a higher engine rotational speed range. The proposed failure detecting device is based upon the fact that if the valve timing is actually changed in response to the instruction signal from the control unit, the states of contact between the first and second cams and the respective first and second rocker arms are changed. Therefore, a value of electric resistance between the rocker arms and a cam shaft on which the cams are integrally formed is detected, and based on the detected electric resistance value and the instruction signal, it is detected whether there is failure in the valve timing changeover mechanism.

However, the proposed failure detecting device requires application of a voltage between the cam shaft and the rocker arms in order to detect the electric resistance value therebetween, so that it is necessary to electrically insulate the cam shaft and rocker arms from the cylinder block of the engine, which results in a more complicated structure of the engine. Further, the cam and rocker arms have to be formed of materials having higher electric resistance, which brings about the problems of the effective lives of the component parts and the manufacturing cost thereof.

SUMMARY OF THE INVENTION

It is the object of the invention to provide a method of detecting failure of a valve timing changeover control system of an internal combustion engine, which is capable of positively detecting the failure of a valve timing changeover mechanism of the system in a simple manner and hence at a low cost.

To attain the above object, according to the invention, there is provided a method of detecting failure of a valve timing changeover control system of an internal combustion engine having at least one inlet valve and at least one exhaust valve, the valve timing changeover control system having changeover means for changing valve timing of the at least one inlet valve, and control means responsive to operating conditions of the engine for supplying a control signal to the changeover means for controlling changeover of the valve timing thereby.

The method according to the invention is characterized by comprising the steps of:

(1) setting a predetermined state of intake air to be supplied to the engine depending on the control signal;
(2) detecting a state of intake air being supplied to the engine;
(3) comparing the detected state of intake air with the set predetermined state of intake air; and
(4) detecting from the result of the comparison whether or not there is failure in the changeover means.

Preferably, the predetermined state of intake air is set in accordance with operating conditions of the engine operating at valve timing dependent on the control signal.

In a first form of the invention, the method is characterized by comprising the steps of:

(1) setting a predetermined amount of intake air to be supplied to the engine depending on the control signal;
(2) detecting an amount of intake air being supplied to the engine;
(3) comparing the detected amount of intake air with the set predetermined amount of intake air; and
(4) detecting from the result of the comparison whether or not there is failure in the changeover means.

Preferably, it is determined that there is failure in the changeover means when a state in which difference between the detected amount of intake air and the predetermined amount of intake air set depending on the control signal exceeds a predetermined value has continued over a predetermined time period.

In a second form of the invention, the method according to the invention is characterized by comprising the steps of:

(1) setting a predetermined pressure level of intake air to be supplied to the engine depending on the control signal;
(2) detecting a pressure level of intake air being supplied to the engine at a location upstream of the at least one inlet valve corresponding to at least one of cylinders of the engine;

(3) comparing the detected pressure level of intake air with the set predetermined pressure level of intake air; and (4) detecting from the result of the comparison whether or not there is failure in the changeover means.

Preferably, the detection of failure of the changeover means is carried out during idling of the engine.

More preferably, the detection of failure of the changeover means is carried out when the control signal gives an instruction for operation of the engine at valve timing for lower engine rotational speeds.

Preferably, the predetermined pressure level of intake air is set depending on electrical load acting on the engine.

More preferably, the predetermined pressure level of intake air is set depending on a state of operation of an air conditioner driven by the engine.

Preferably, the predetermined pressure level is corrected depending on atmospheric pressure.

Preferably, the pressure level of intake air is detected in terms of absolute pressure of intake air, and it is determined that there is failure in the changeover means when the detected level of absolute pressure of intake air is higher than the predetermined pressure level of intake air.

Preferably, the pressure level of intake air is detected by means of a plurality of pressure-detecting means provided respectively for the cylinders.

Alternatively, the pressure level of intake air is detected by means of single pressure-detecting means, the pressure level of intake air upstream of the inlet valves corresponding respectively to the cylinders being sequentially connected to the single pressure-detecting means by rotary changeover means upon each lapse of a predetermined time period.

The above and other objects, features, and advantages of the present invention will become more apparent from the ensuing detailed description taken in conjunction with the accompanying drawings.

BRIEF DESCRIPTION OF THE DRAWINGS

FIG. 2b is a diagram showing a valve timing changeover control system including the device of FIG. 2a;

FIG. 11a is a graph showing changes in the negative pressure within the intake manifold resulting from faulty holding of valve timing at high speed valve timing when the engine is idling and at the same time not loaded with either of electrical load and air-conditioner load;

FIG. 11b is a graph showing changes in the negative pressure within the intake manifold resulting from faulty holding of valve timing at high speed valve timing when the engine is idling and at the same time loaded with electrical load;

FIG. 11c is a graph showing change in the negative pressure within the intake manifold resulting from faulty holding of valve timing at high speed valve timing when the engine is idling and at the same time loaded with air conditioner load;

FIG. 12 is a flowchart of a subroutine for detecting failure of the valve timing changeover mechanism, which is executed for the control system of FIG. 7 equipped with the manifold absolute pressure sensors 55 of FIG. 8;

DETAILED DESCRIPTION

The method according to the invention will now be described in detail with reference to the drawings showing embodiments thereof.

Figure 1:
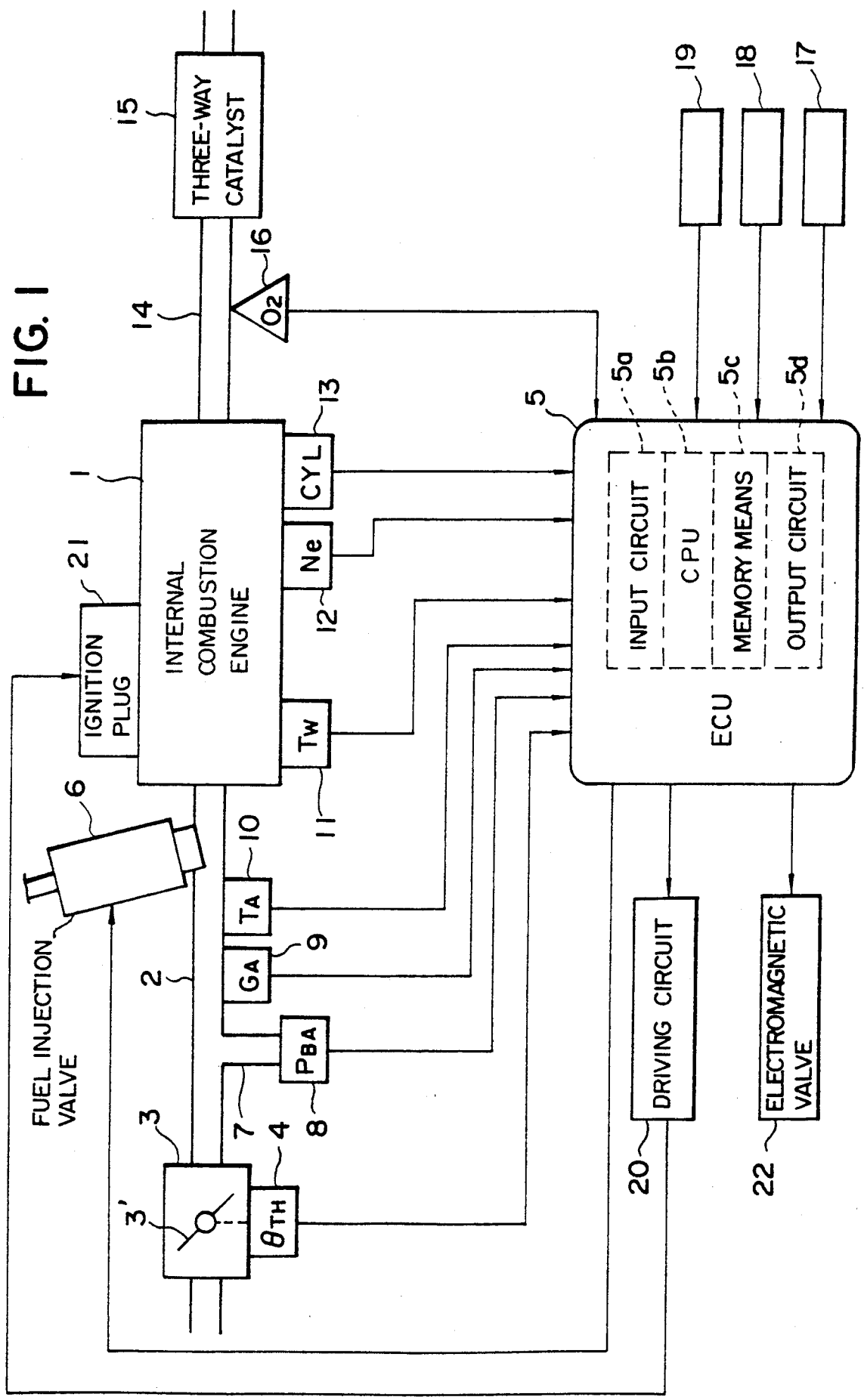
FIG. 1 is a schematic diagram showing the whole arrangement of an internal combustion engine and a control system therefor to which is applied the method of detecting failure of a valve timing changeover control system according to a first embodiment of the invention.

Referring first to FIG. 1, there is shown the whole arrangement of an internal combustion engine and a control system therefor to which is applied the method of detecting failure of a valve timing changeover control system according to a first embodiment of the invention. In the figure, reference numeral 1 designates an internal combustion engine of DOHC in-line 4 cylinder type for automotive vehicles, in which two pairs of inlet and exhaust valves are provided for each cylinder. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

Ignition plugs 21 are provided for respective cylinders of the engine 1 and connected via a driving circuit 20 to the ECU 5 which controls the ignition timing $\theta$ig of the ignition plugs 21.

Further, an electromagnetic valve 22 for valve timing changeover control, described hereinafter, is connected to the output side of the ECU 5 which controls opening and closing of the electromagnetic valve 22.

On the other hand, an intake pipe absolute pressure ($P_{BA}$) sensor 8 is provided in communication with the interior of the intake pipe 2 at a location immediately downstream of the throttle valve 3' by way of a conduit 7 for supplying an electric signal indicative of the sensed absolute pressure within the intake pipe 2 to the ECU 5.

At a location downstream of the intake pipe absolute pressure sensor 8, there is provided an intake air amount ($G_A$) sensor 9 for supplying an electric signal indicative of the sensed intake air amount ($G_A$) to the ECU 5. The intake air amount ($G_A$) sensor 9 may be a known hot-wire type sensor which detects an amount of the intake air from a value of electric current flowing in a hot metalic wire which is controlled such that the hot metalic wire heated by electric current is held at a predetermined temperature.

An intake air temperature ($T_A$) sensor 10 is inserted into the intake pipe 2 at a location downstream of the intake air amount sensor 9 for supplying an electric signal indicative of the sensed intake air temperature $T_A$ to the ECU 5.

An engine coolant temperature ($T_W$) sensor 11, which may be formed of a thermistor or the like, is mounted in the cylinder block of the engine 1, for supplying an electric signal indicative of the sensed engine coolant temperature $T_W$ to the ECU 5. An engine rotational speed (Ne) sensor 12 and a cylinder-discriminating (CYL) sensor 13 are arranged in facing relation to a camshaft or a crankshaft, not shown, of the engine 1. The engine rotational speed sensor 12 generates a pulse as a TDC signal pulse at each of predetermined crank angles whenever the crankshaft rotates through 180 degrees, while the cylinder-discriminating sensor 13 generates a pulse at a predetermined crank angle of a particular cylinder of the engine, both of the pulses being supplied to the ECU 5.

A three-way catalyst 15 is arranged within an exhaust pipe 14 connected to the cylinder block of the engine 1 for purifying noxious components such as HC, CO, and NOx. An $O_2$ sensor 16 as an exhaust gas ingredient concentration sensor is mounted in the exhaust pipe 14 at a location upstream of the three-way catalyst 15, for sensing the concentration of oxygen present in exhaust gases emitted from the engine 1 and supplying an electric signal indicative of the sensed oxygen concentration to the ECU 5.

Further electrically connected to the ECU 5 are a vehicle speed sensor 17, a gear position sensor 18 for detecting the shift lever position of a transmission, and an oil pressure sensor 19 for detecting oil pressure in an oil feeding passage (43 in FIG. 2b), referred to hereinafter, of the engine 1. Signals from these sensors are supplied to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b, memory means 5c storing various operational programs which are executed in the CPU 5b and for storing results of calculations therefrom, etc., and an output circuit 5d which outputs driving signals to the fuel injection valves 6, a driving circuit 20, and the electromagnetic valve 22.

The CPU 5b operates in response to the above-mentioned signals from the sensors to determine operating conditions in which the engine 1 is operating such as an air-fuel ratio feedback control region for controlling the air-fuel ratio in response to oxygen concentration in exhaust gases and open-loop control regions, and calculates, based upon the determined operating conditions, the valve opening period or fuel injection period $T_{OUT}$ over which the fuel injection valves 6 are to be opened, by the use of the following equation in synchronism with inputting of TDC signal pulses to the ECU 5.

$$T_{OUT} = T_i \times K_1 + K_2 \tag{1}$$

where Ti represents a basic fuel amount, more specifically a basic fuel injection period of the fuel injection valves 6, which is determined based upon the engine rotational speed Ne and the intake pipe absolute pressure $P_{BA}$. As the Ti map for determining the Ti value, a $Ti_L$ map for low speed valve timing and a $Ti_H$ map for high speed valve timing are stored in the memory means 5C.

$K_1$ and $K_2$ represent other correction coefficients and correction variables, respectively, which are calculated based on various engine parameter signals to such values as to optimize operating characteristics of the engine such as fuel consumption and accelerability, depending on operating conditions of the engine.

The CPU 5b decides the ignition timing $\theta$ig based on the engine rotational speed Ne and the intake pipe absolute pressure $P_{BA}$. As the $\theta$ig map for determining the ignition timing, similarly to the Ti maps, a $\theta ig_L$ map for the low speed valve timing and a $\theta ig_H$ map for the high speed valve timing are stored in the memory means 5C.

Further, the CPU 5b supplies the output circuit 5d with an instruction signal for changing the valve timing in a manner described hereinafter with reference to FIG. 3 to thereby control the opening and closing of the electromagnetic valve 23, and also supplies the output circuit 5d with driving signals for driving the fuel injection valves 6 and the driving circuit 21, based upon the results of the above calculations and decisions. The CPU 5b also carries out failsafe operation by detecting failure of a valve timing changeover control system in a manner shown in FIG. 5.

Figure 2A:
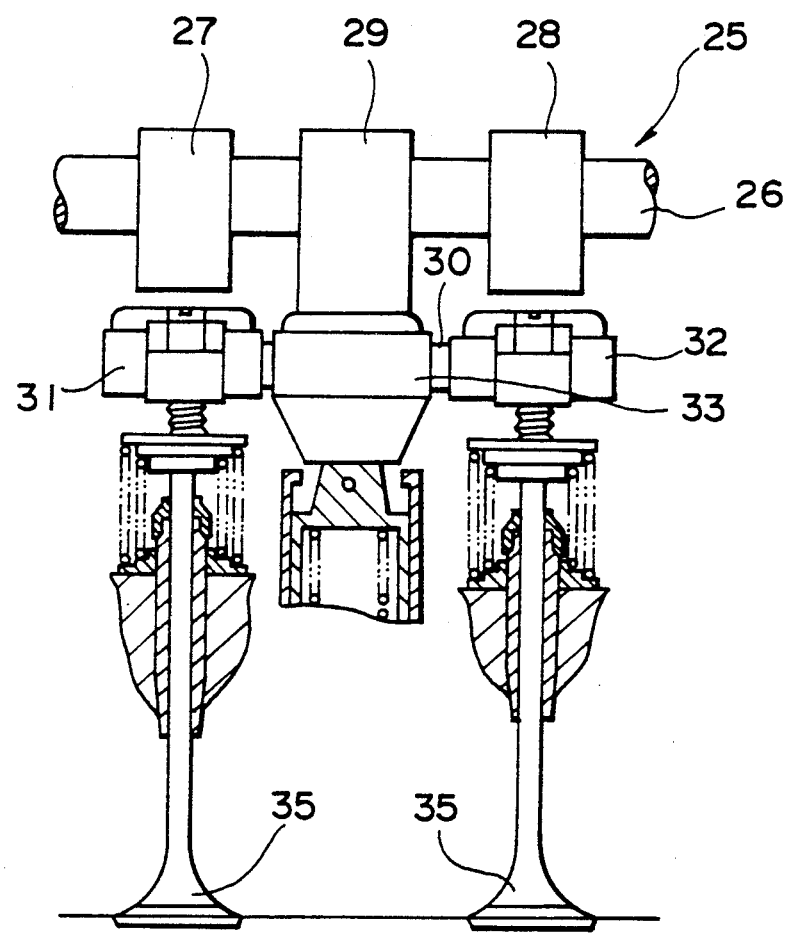
FIG. 2a is a diagram showing an inlet valveoperating device of the engine.

FIG. 2a shows an inlet valve-operating device 25 for driving the inlet valves 35 of each cylinder of the engine 1. An exhaust valve-operating device, not shown, basically having the same construction as the device 25 is provided for the exhaust valves. The inlet valve-operating device 25 comprises a camshaft 26 rotatively driven by a crankshaft, not shown, of the engine at a speed ratio of ½ relative to the latter, a high speed cam 29 and low speed cams 27, 28 secured on the camshaft 26, the three cams 27 to 29 being provided for each cylinder, a rocker shaft 30 extending parallel with the camshaft 26, first and second driving rocker arms 31 and 32, and a free rocker arm 33 pivotally mounted on the rocker shaft 30, the three arms 31 to 33 being provided for each cylinder, and a connection-changeover mechanism 34 (valve timing changeover mechanism) arranged in the corresponding rocker arms 31, 32, 33 for each cylinder as shown in FIG. 2b.

Figure 2B:
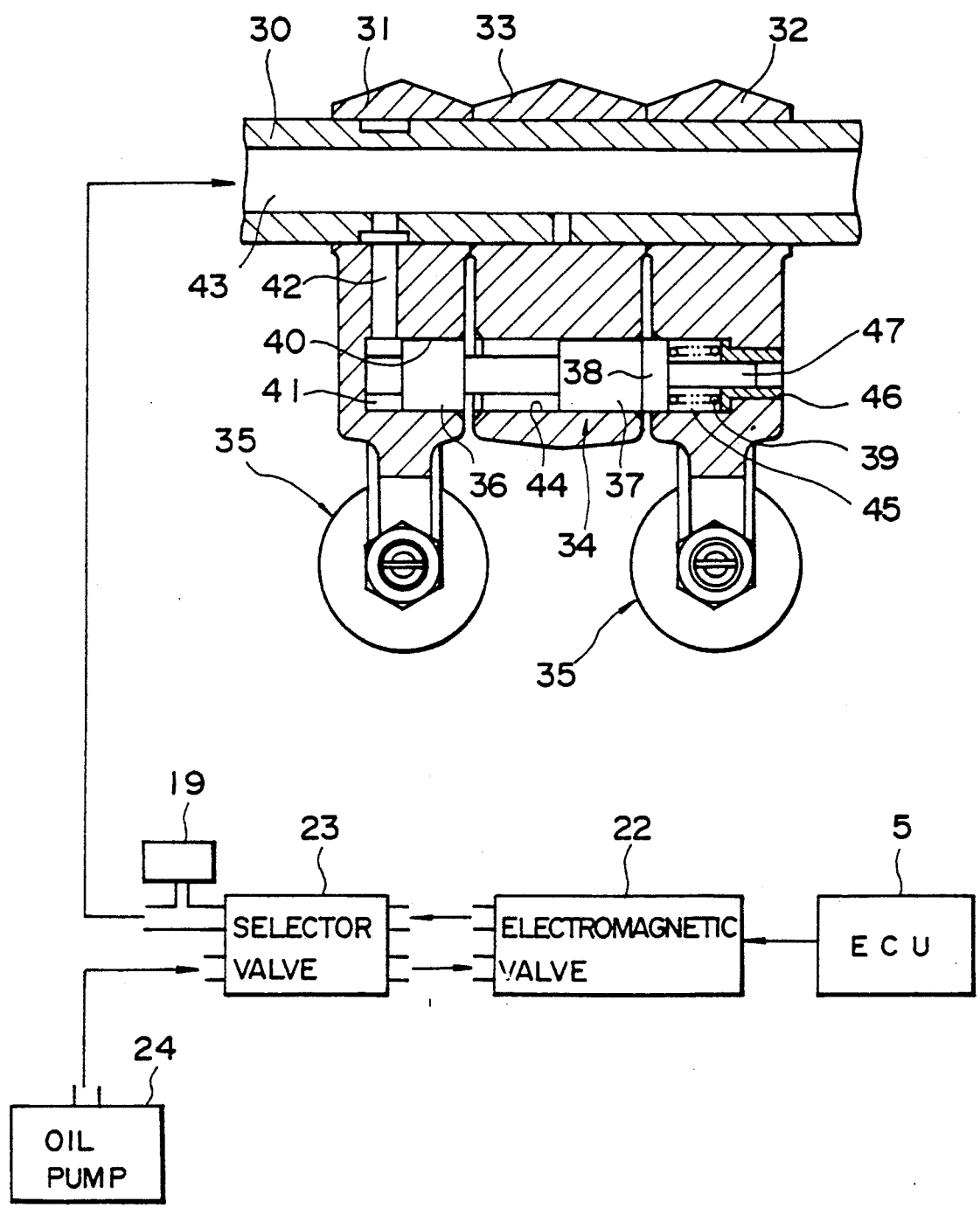

FIG. 2b shows a valve timing changeover control system including the device of FIG. 2a. As shown in the figure, the connection-changeover mechanism 34 comprises a first changeover pin 36 capable of connecting the first driving rocker arm 31 with the free rocker arm 33, a second changeover pin 37 capable of connecting the second driving rocker arm 32 with the free rocker arm 33, a restriction pin 38 for restricting the movement of the first and second changeover pins 36, 37, and a return spring 39 urging the pins 36, 37, 38 in the rocker arm-disconnecting direction.

The first driving rocker arm 31 is formed therein with a first guide bore 40 extending parallel with the rocker shaft 30 with one end thereof closed and the other end opening in a side face thereof facing the free rocker arm 33. The first changeover pin 36 is slidably fitted in the first guide bore 40, defining an oil hydraulic chamber 41 between one end thereof and the closed end of the first guide bore 40. Further, a passage 42 extends in the rocker arm 31 and the rocker shaft 30 from the oil hydraulic chamber 41 and opens into an oil feeding passage 43 formed in the rocker shaft 30 so that the oil feeding passage 43 permanently communicates via the passage 42 with the oil hydraulic chamber 41 irrespective of rocking motion of the first driving rocker arm 31.

The free rocker arm 33 is formed therein with a guide through hole 44 at a location corresponding to the first guide bore 40, which extends through the free rocker arm 33 and parallel with the rocker shaft 30. The second changeover pin 37 is slidably fitted in the guide through hole 44, with one end thereof abutting on an opposed end face of the first changeover pin 36.

The second driving rocker arm 32 is formed therein with a second guide bore 45 at a location corresponding to the guide through hole 44, which extends parallel with the rocker shaft 30 with one end thereof opening toward the free rocker arm 33. The restriction pin 38 in the form of a disc is slidably fitted in the second guide bore 45, in a fashion abutting on the other end of the second changeover pin 40. Further, the second guide bore 45 has a guide sleeve 46 fitted therein, in which is slidably fitted an axial rod 47 which coaxially and integrally projects from the restriction pin 38. The return spring 39 is interposed between the guide sleeve 46 and the restriction pin 38 and urges the pins 36, 37, 38 toward the oil hydraulic chamber 41.

In the connection-changeover mechanism 34 constructed as above, when the pressure in the oil hydraulic chamber 41 is increased, the first changeover pin 36 is forced to move into the guide through hole 44 and at the same time the second changeover pin 37 is urgedly moved into the second guide bore 45 to connect the rocker arms 31, 32, 33 together. When the pressure in the oil hydraulic chamber 41 is decreased, the first changeover pin 36 is moved back by the urging force of the spring 39 into a position in which the end face thereof abutting on the second changeover pin 37 corresponds in location to the space between the first driving rocker arm 31 and the free rocker arm 33, and at the same time the second changeover pin 37 is moved back into a position in which the end face thereof abutting on the restriction pin 38 corresponds in location to the space between the free rocker arm 33 and the second driving rocker arm 32, whereby the rocker arms 31, 33, 32 become disconnected from each other.

The oil feeding passage 43 within the rocker shaft 30 is connected to an oil pump 24 via a selector valve 23 which operates to change over the oil pressure within the oil feeding passage 43 and hence the oil pressure within the oil hydraulic chamber 41 of the connection-changeover mechanism 34 between high and low levels. The selector valve 23 is connected to the electromagnetic valve 22, and the ECU controls the changeover operation of the selector valve 23 via the electromagnetic valve 22.

The inlet valve-operating device 25 of the engine 1 constructed as above operates in the following manner (in addition, the exhaust valve-operating device operates similarly):

When the ECU 5 sends out a valve-opening instruction signal to the electromagnetic valve 22, the electromagnetic valve 22 is opened to thereby cause the selector valve 23 to open, so that the oil pressure in the oil feeding passage 43 is increased. This causes the connection-changeover mechanism 34 to operate to connect the rocker arms 31, 32, 33 together, whereby the high speed cam 29 operates the rocker arms 31, 32, 33 in unison (FIG. 2a shows this state) to cause each pair of inlet valves 35 to open and close at high speed valve timing in which the valve-opening period and the valve lift amount are relatively greater.

On the other hand, when the ECU 5 supplies a valve-closing instruction signal to the electromagnetic valve 22, the electromagnetic valve 22 and in turn the selector valve 23 are closed to thereby decrease the oil pressure in the oil feeding passage 43. This causes the connection-changeover mechanism 34 to operate to disconnect the rocker arms 31, 32, 33 from each other, whereby the low speed cams 27, 28 operate the corresponding rocker arms 31, 32 to cause the pair of inlet valves 35 to open and close at low speed valve timing in which the valve-opening period and the valve lift amount are relatively smaller.

Figure 3B:
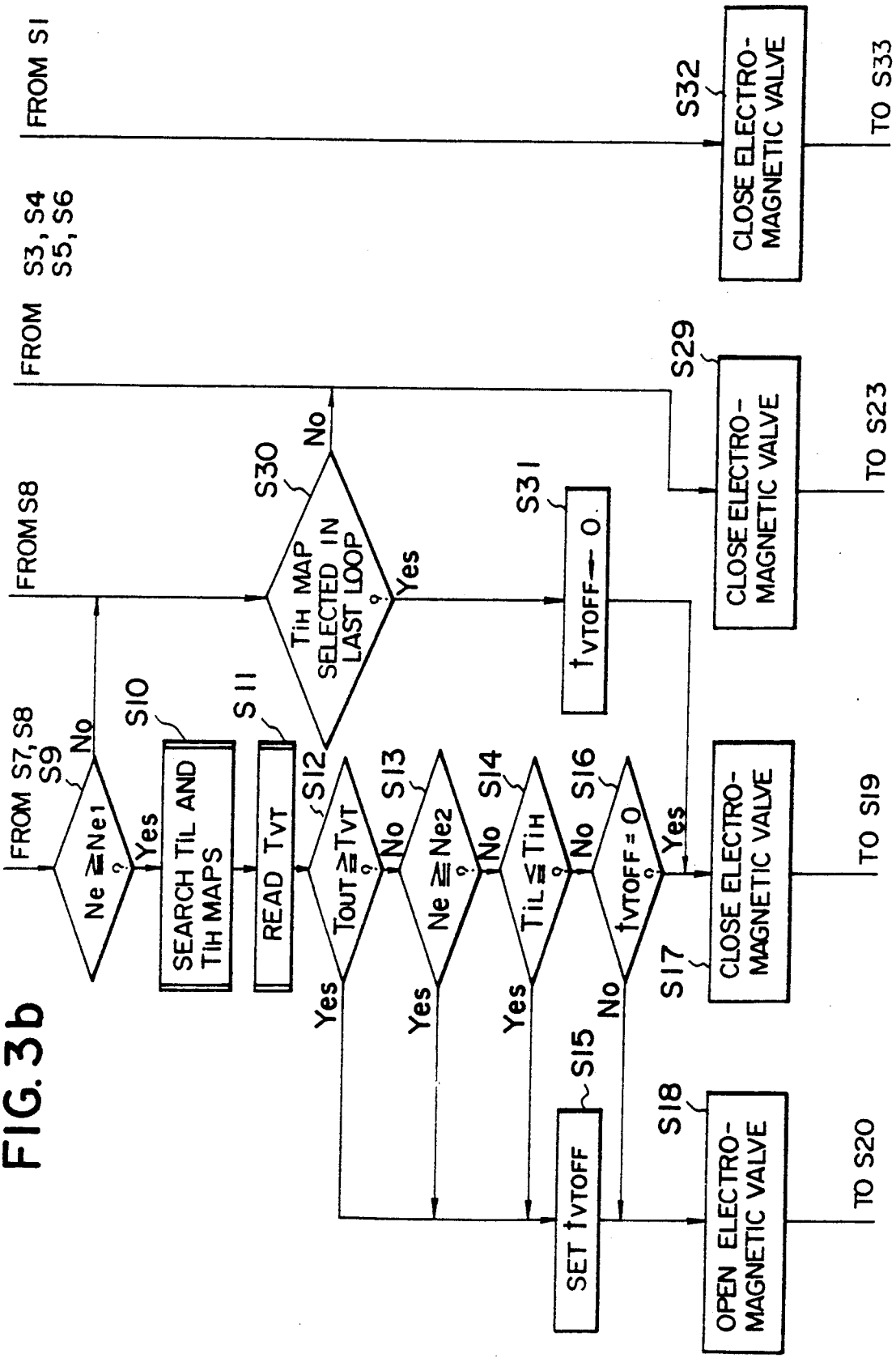
FIG. 3 is a flowchart of a subroutine for controlling the changeover of valve timing.

Next, reference is made to FIG. 3 to explain a program for controlling the changeover of the valve timing executed by the ECU 5, i.e. a program for output control of signals supplied to the electromagnetic valve 22. This program is executed upon generation of each pulse of the TDC signal and in synchronism therewith.

At a step S1, it is determined whether or not a failsafe operation should be carried out, e.g. by determining whether or not engine operating parameter sensors are normally functioning or whether or not abnormality has occurred in the control system other than such sensors.

Specifically, it is determined that a failsafe operation should be carried out, if, for example, there is detected an abnormality in the output from any of the intake pipe absolute pressure ($P_{BA}$) sensor 8, the cylinder-discriminating (CYL) sensor 13, the engine rotational speed (TDC) sensor 12, the engine coolant temperature sensor 11, and the vehicle speed sensor 17, an abnormality in the outputting of a control signal for ignition timing or in the outputting of driving signals for the fuel injection valves, an abnormality in the amount of electric current supplied to the electromagnetic valve 22 for the valve timing control, or an abnormality that a normal change has not been detected in oil pressure at the selector valve 23 responsive to opening and closing of the electromagnetic valve 22 for the valve timing control by an oil pressure switch of the oil pressure sensor 19, over a predetermined time period. Incidentally, when one of the CYL sensor and the TDC sensor is abnormal, the other is used in place thereof.

If the answer to the question of the step S1 is Yes, i.e, if the failsafe operation should be carried out, the program proceeds to a step S32, referred to hereinafter, and if the answer is No, the program proceeds to a step S2.

At the step S2, it is determined whether or not the engine is being started, from the engine rotational speed Ne, etc., and at a step S3, it is determined whether or not a delay timer has counted up a predetermined time period (e.g. 5 seconds) $t_{ST}$. If the answer to the question of the step S2 is Yes, the program proceeds to a step S4, where the timer is set to the predetermined time period $t_{ST}$ for starting to count same after the engine starting has been completed. At a step S5, it is determined whether or not the engine coolant temperature $T_W$ is lower than a predetermined value $T_{W1}$ (e.g. 60° C.), i.e. whether or not the engine is in warming-up operation. At a step S6, it is determined whether or not the vehicle speed V is lower than a very low predetermined value $V_1$ (with a hysteresis, e.g. 8 km/5 km). At a step S7, it is determined whether or not the vehicle on which the engine is installed is provided with a manual transmission (MT). At a step S8, it is determined, when the vehicle is an automatic transmission type (AT), whether or not the shift lever is positioned in the parking range (P) or the neutral range (N). At a step S9, it is determined whether or not the engine rotational speed Ne is not lower than the predetermined lower limit value $Ne_1$ (e.g. 4800 rpm/4600 rpm). If as a result of the above determinations, the failsafe operation is being carried out (the answer to the question of the step S1 is Yes), or if the engine is being started (the answer to the question of the step S2 is Yes), or if the predetermined time period $t_{ST}$ has not elapsed after the enginer has completed starting (the answer to the question of the step S3 is No), or if the engine is still in warming-up operation (the answer to the question of the step S5 is Yes), or if the vehicle is standing or moving slowly (the answer to the question of the step S6 is Yes), or if the shift lever is in the P or N range (the answer to the question of the step S8 is Yes), or if Ne<$Ne_1$ (the answer to the question of the step S9 is No), the electromagnetic valve 22 is closed to maintain the low speed valve timing.

If it is determined at the step S9 that Ne≧$Ne_1$ is satisfied, at a step S10, from the $Ti_L$ map and the $Ti_H$ map, there are obtained a Ti value (hereinafter referred to as "$Ti_L$") of the $Ti_L$ map and a Ti value (hereinafter referred to as "$Ti_H$") of the $Ti_H$ map each corresponding to the engine rotational speed Ne and the intake air absolute pressure $P_{BA}$. Then, at a step S11, from a $T_{VT}$ table set depending on whether the vehicle is AT or MT is obtained a high load determination value $T_{VT}$ corresponding to the engine rotational speed Ne. At a step S12, the value $T_{VT}$ is compared with the fuel injection period $T_{OUT}$ in the immediately preceding loop to determine whether $T_{OUT}$≧$T_{VT}$ is satisfied, i.e. whether the engine is in a high load operating condition in which the air-fuel ratio should be enriched. In this connection, the value $T_{VT}$ is a reference value for determining the high load operating condition of the engine based on the fuel injection amount, and values thereof are set in accordance with the engine rotational speed Ne in the $T_{VT}$ table. If the step S12 is No, i.e. if $T_{OUT}$<$T_{VT}$ is satisfied, the program proceeds to a step S13, where it is determined whether or not the engine rotational speed Ne is not lower than a predetermined upper limit value $Ne_2$ (e.g. 5900 rpm/5700 rpm). If the answer to the question of the step S13 is No, i.e. if Ne<$Ne_2$ is satisfied, the program proceeds to a step S14, where the value $Ti_L$ and the value $Ti_H$ obtained at the step S10 are compared with each other. If $Ti_L$>$Ti_H$ is satisfied, it is determined at a step S16 whether or not a timer value $t_{VTOFF}$ of a delay timer set at a step S15, referred to hereinafter, has been counted up. If the answer to the question of the step S16 is Yes, an instruction signal for closing the electromagnetic valve 22, i.e. an instruction for changing the valve timing over to the low speed valve timing, is generated at a step S17. On the other hand, if any of $T_{OUT}$≧$T_{VT}$, Ne≧$Ne_2$, and $Ti_L$≦$Ti_H$ is satisfied, the delay timer for closing the electromagnetic valve is set to a predetermined value $t_{VTOFF}$ (e.g. 3 seconds) and started at the step S15. Then at a step S18, an instruction signal for opening the electromagnetic valve 22, i.e. an instruction for changing the valve timing over to the high speed valve timing is generated.

If the valve-closing signal is generated at the step S17, it is determined at a step S19 whether or not the oil pressure switch within the oil pressure sensor 19 has been turned on, i.e. if the oil pressure in the oil feeding passage 43 has become low. If the answer to the question of the step S19 is Yes, i.e. if the oil pressure switch has been turned on, it is determined at a step S21 whether or not a changeover delay timer has counted up a predetermined time period $t_{LVT}$ for the low speed valve timing. If the answer to the question of the step S21 is Yes, i.e. if $t_{LVT}$=0, another changeover delay timer for the high speed valve timing is set to a predetermined time period $t_{HVT}$ (e.g. 0.1 second) and started at a step S23. Then at a step S25, the $Ti_L$ map and an ignition timing map ($θig_L$ map) for the low speed valve timing are selected as the Ti map and the ignition timing map to be used in a routine for fuel injection control. At the following step S27, a revolution limitter value $N_{HFC}$ is set to a predetermined value $N_{HFC1}$ (e.g. 7500 rpm) for the low speed valve timing. The revolution limitter value $N_{HFC}$ is set in order to prevent an excessive rotational speed of the engine, and if the engine rotational speed Ne exceeds the revolution limitter value $N_{HFC}$, fuel supply is cut off.

On the other hand, if the valve-opening signal is generated at the step S18, it is determined at a step S20 whether or not the oil pressure switch within the oil pressure sensor 19 has been turned off, i.e. if the oil pressure in the oil feeding passage 43 has become high. If the answer to the question of the step S20 is Yes, i.e. if the oil pressure switch has been turned off, it is determined at a step S22 whether or not the changeover delay timer for the high speed valve timing has counted up the value $t_{HVT}$. If the answer to the question of the step S22 is Yes, i.e. if $t_{HVT}$=0, the changeover delay timer for the low speed valve timing is set to a predetermined time period $t_{LVT}$ (e.g. 0.2 seconds) at a step S24, and then at a step S26, the $Ti_H$ map and an ignition timing map ($θig_H$ map) for the high speed valve timing are selected as the Ti map and the ignition timing map to be used in the routine for fuel injection control. At the following step S28, the revolution limitter value $N_{HFC}$ is set to a predetermined value $N_{HFC2}$ (e.g. 8100 rpm) for the high speed valve timing, which is higher than $N_{HFC1}$.

The predetermined delay time periods $t_{HVT}$ and $t_{LVT}$ are set at such values as correspond to the respective time lags, i.e. periods of time to elapse from opening and closing of the electromagnetic valve 22, through switching of the selector valve 23, and the resulting change in the oil pressure in the oil feeding passage 43, until completion of changeover operations by the connection-changeover mechanisms 34 of all the cylinders. When the electromagnetic switch 22 is closed, the program proceeds in the order of S19-S22-S24-S26-S28 until the oil pressure switch within the oil pressure sensor 19 is turned on. After the oil pressure switch has been turned on, the program proceeds in the order of S19-S21-S26-S28 until the connection-changeover mechanisms 34 of all the cylinders have been changed over to the low speed valve timing position. Further, if the selector valve 23 is not closed due to failure of the electromagnetic valve 22 or the selector valve 23 etc. so that the oil pressure switch within the oil pressure sensor 19 remains open or off, the program also proceeds in the above-mentioned order of S19-S22-S24-S26-S28. Thus, until the connection-changeover mechanisms 34 of all the cylinders have been changed over to the low speed valve timing position, the fuel injection is controlled in a manner suitable for the high speed valve timing. Also, when the electromagnetic switch 22 is opened, the fuel injection is controlled in a manner suitable for the low speed valve timing until the connection-changeover mechanisms 34 of all the cylinders have been changed over to the high speed valve timing position.

In the meanwhile, if the engine is being started (the answer to the question of the step S2 is Yes), or if the time period $t_{ST}$ has not elapsed after completion of the engine starting (the answer to the question of the step S3 is No), or if the engine has not yet been warmed up (the answer to the question of the step S5 is Yes), or if the vehicle is standing or moving slowly (the answer to the question of the step S6 is Yes), the program proceeds to the step S29, where the instruction signal for closing the electromagnetic valve 22 is generated, followed by the program proceeding in the order of S23-S25-S27. If it is determined at the step S8 that the shift lever position is in the N or P range, the program proceeds to a step S30, where it is determined whether or not the $Ti_H$ map has been selected in the immediately preceding loop. Also, if it is determined at the step S9 that $Ne < Ne_1$ is satisfied, the program proceeds to the step S30. If the answer to the question of the step S30 is Yes, i.e. if the $Ti_H$ map has been selected in the immediately preceding loop, the time period $t_{VTOFF}$ of the delay timer over which the electromagnetic valve is to be opened is set to 0 at a step S31, and then the program proceeds to a step S17. If the answer to the question of the step S30 is No, i.e. if the $Ti_H$ map has not been used in the immediately preceding loop, in other words, if the connection-changeover mechanisms 34 of all the cylinders have not been changed over to the high speed valve timing position, the program proceeds, as described above, in the order of S29-S23-S25-S27, whereby the fuel injection is controlled in a manner suitable for the low speed valve timing irrespective of the state of the oil pressure switch within the oil pressure sensor 19. This is a counter-measure for the case in which the oil pressure switch within the oil pressure sensor 19 continues to be off due to disconnection in the wiring etc.

The aforesaid revolution limiter Ne value $N_{HFC1}$ is set at a value higher than the value $Ne_2$, and normally the valve timing is switched to the high speed valve timing and accordingly the revolution limiter $N_{HFC}$ is set to the higher value $N_{HFC2}$ before the engine rotational speed Ne rises to the value $N_{HFC1}$, so that fuel cut is not carried out even at the value $N_{HFC1}$. On the other hand, when the engine is in an operating condition in which the program proceeds from any of the steps S2-S6, and S8 to the step S29, the fuel cut can be carried out at the value $N_{HFC1}$, since the low speed valve timing is maintained even after the engine rotational speed Ne exceeds the value $Ne_2$ due to racing of the engine etc. Further, even after the valve timing is switched from the low speed valve timing to the high speed valve timing, fuel cut is carried out at the value $N_{HFC1}$ before the timer count $t_{HVT}$ becomes 0, i.e. before the connection-changeover mechanisms 34 are actually changed over to the high speed valve timing position.

In a subroutine used at the step S10 for obtaining $Ti_L$ and $Ti_H$ from the respective $Ti_L$ and $Ti_H$ maps, it is determined whether or not the instruction signal for opening the electromagnetic switch 22 has been generated in the immediately preceding loop. If the instruction signal has not been generated, the value $Ti_L$ to be used at the step S14 is set to a value $Ti_L$ obtained from the $Ti_L$ map, whereas if the instruction signal has been generated, the value $Ti_L$ to be used at the step S14 is set to a value obtained by subtracting a predetermined hysteresis amount $\Delta Ti$ from a value $Ti_L$ obtained from the $Ti_L$ map.

Also in a subroutine used at the step S11 for obtaining the high load determination value $T_{VT}$ from the $T_{VT}$ table, it is determined whether or not the instruction signal for opening the electromagnetic valve 22 has been generated in the immediately preceding loop. If the signal has not been generated, the value $T_{VT}$ to be used at the step S12 is set to a value $T_{VT}$ obtained from the $T_{VT}$ table, whereas if the signal has been generated, the value $T_{VT}$ to be used at the step S12 is set to a value obtained by subtracting a predetermined hysteresis amount $\Delta T_{VT}$ from a value $T_{VT}$ obtained from the $T_{VT}$ table.

Referring again to FIG. 3, if the answer to the question of the step S1 is Yes, i.e. if the failsafe operation should be carried out, the instruction signal for closing the electromagnetic valve 22 is generated at a step S32, and then at a step S33 the failsafe operation, described below, is carried out, followed by the program proceeding to the step S27.

Figure 4:
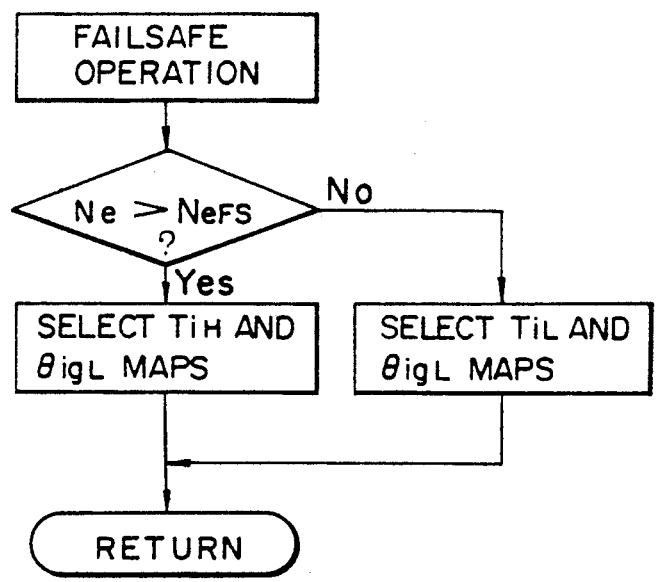
FIG. 4 is a flowchart of a subroutine for failsafe operation carried out at a step appearing in the flowchart of FIG. 3.

FIG. 4 shows an example of the failsafe operation carried out at the step S33. According to FIG. 4, when the engine rotational speed Ne is higher than a predetermined value $Ne_{FS}$ (e.g. 3,000 rpm), the $Ti_H$ map for the high speed valve timing and the $\theta ig_L$ map for the low speed valve timing are selected, whereas when the engine rotational speed Ne is not higher than the predetermined value $Ne_{FS}$, the $Ti_L$ map for the low speed valve timing and the $\theta ig_L$ map are selected.

The values of the basic fuel injection period Ti are set in the $Ti_H$ and $Ti_L$ maps such that the values of the fuel injection period in the $Ti_H$ map for the high speed valve timing are greater than those of the $Ti_L$ map for the low speed valve timing in a region where the engine rotational speed Ne is high. Therefore, according to the method shown in FIG. 4, when the inlet and exhaust valves are actually operated at the high speed valve timing due to failure of any of the selector valve 23, the connection-changeover mechanisms 34, etc. even while the instruction signal for closing the electromagnetic valve 22 is generated during the failsafe operation, it is possible to prevent overleaning of the air-fuel ratio and hence an excessive rise in the burning temperature of the mixture or the catalyst temperature of exhaust gas purifying means, and accordingly also prevent melting of ignition plugs due to preignition of the mixture, knocking at a high engine rotational speed, and shortened life of the catalyst.

Figure 5:
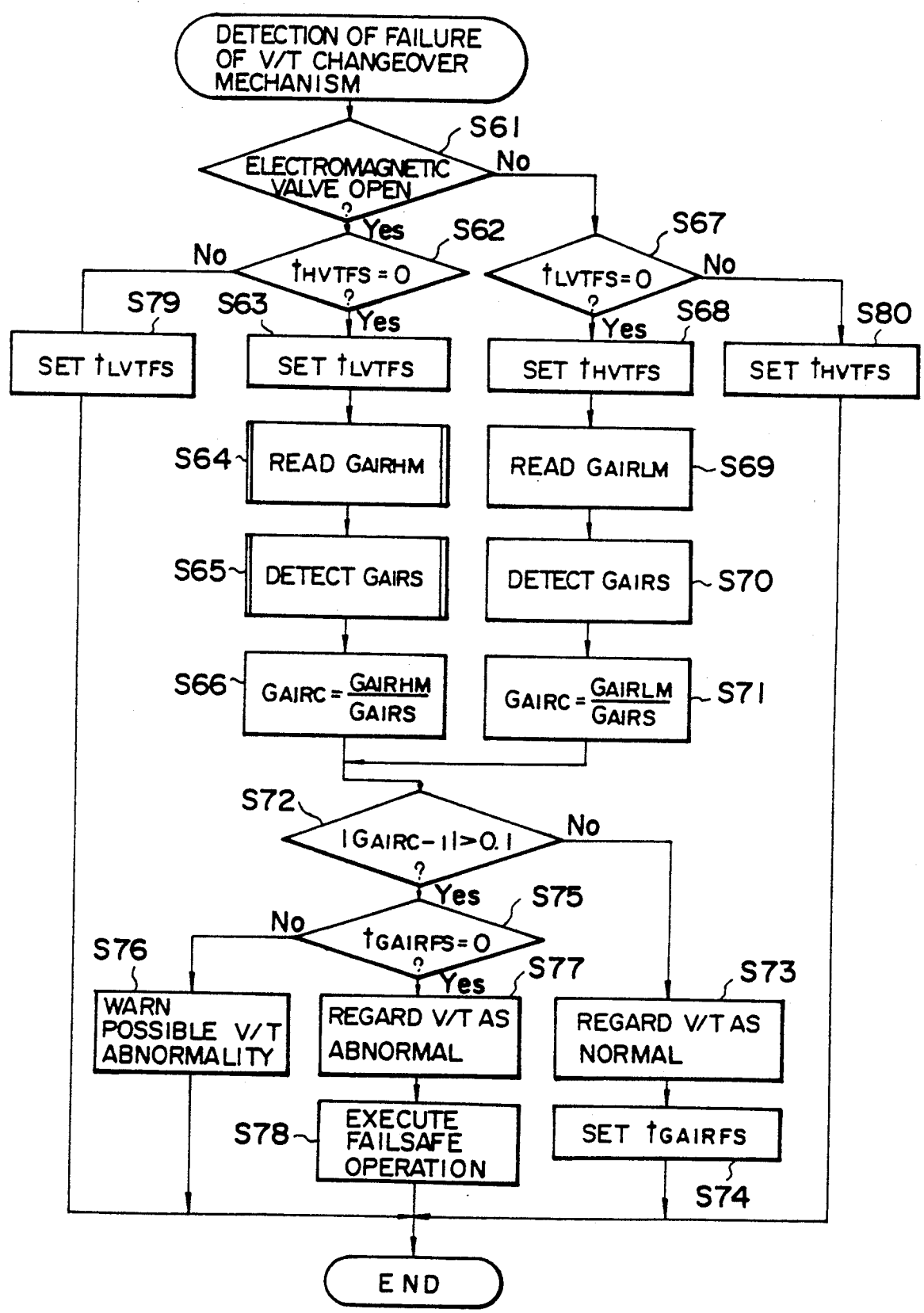
FIG. 5 is a flowchart of a subroutine for detecting failure of a valve timing changeover mechanism of the valve timing changeover control system.

FIG. 5 shows a program for detecting failure of the valve timing changeover mechanism by the use of an output signal from the intake air amount ($G_A$) sensor 9.

Figure 6:
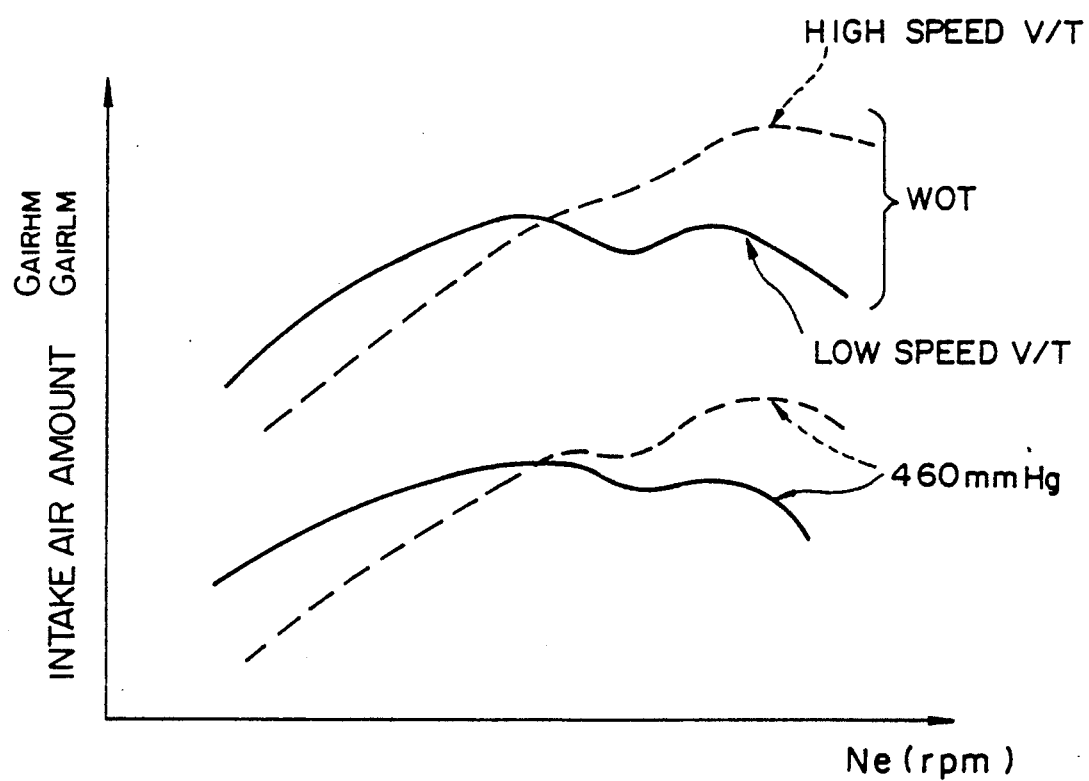
FIG. 6 is a graph illustrating a map of theoretical values of the intake air amount to be read at a step appearing in FIG. 5.

At a step S61, it is determined whether or not the ECU is supplying a valve-opening instruction signal to the electromagnetic valve 22. If the answer to this question is affirmative (Yes), i.e. if it is determined that the ECU 5 is supplying the valve-opening instruction signal to the electromagnetic valve 22 to open same, the program proceeds to a step S62 where it is determined whether or not a value $t_{HVTFS}$ of a $t_{HVTFS}$ delay timer set at a step S68 or S80, both referred to hereinafter, is equal to 0. If the answer to this question is affirmative (Yes), i.e. if it is determined that a predetermined time period set for counting by the $t_{HVTFS}$ delay timer has elapsed after the instruction signal for valve timing from the ECU 5 changed from one for low speed valve timing over to one for high speed valve timing, a value $t_{LVTFS}$ of a $t_{LVTFS}$ delay timer is set to a predetermined value (e.g. 4 seconds) at a step S63, and then a theoretical value $G_{AIRHM}$ of the intake air amount to be obtained when the valve timing is set to high speed valve timing is read at a step S64. The theoretical value $G_{AIRHM}$ is obtained e.g. from a map illustrated in FIG. 6 as an ideal value to be obtained in accordance with the engine rotational speed Ne and the intake pipe absolute pressure $P_{BA}$ when the valve timing is set to high speed valve timing.

Then the program proceeds to a step S65, where an actual value $G_{AIRS}$ of the intake air amount detected by the intake air amount $G_A$ sensor is read, and then at a step 66, the ratio $G_{AIRC}$ of the theoretical value $G_{AIRHM}$ to the actual value $G_{AIRS}$ is calculated.

Then at a step S72, it is determined whether or not the absolute value of difference between the ratio $G_{AIRC}$ obtained at the step S66 and the ideal value 1 is larger than a tolerance value 0.1. In other words, it is determined whether or not the actual value $G_{AIRS}$ of the intake air amount exceeds a range of possible values of the intake air amount to be assumed during normal operation of the valve timing changeover mechanism. If the answer to this question is negative (No), the valve timing changeover mechanism is regarded as normally fuctioning at a step S73, and the value $t_{GAIRFS}$ of a $t_{GAIRFS}$ delay timer is set to a predetermined value at a step S74, followed by terminating the present program.

If the answer to the question of the step S72 is affirmative (Yes), i.e. if it is determined that the absolute value of difference between the ratio $G_{AIRC}$ and the ideal value 1 exceeds the tolerance value 0.1, the program proceeds to a step S75, where it is determined whether or not the value $t_{GAIRFS}$ of the $t_{GAIRFS}$ delay timer reset at the step S74 is equal to 0. If the answer to this question is negative (No), as a warning of possible abnormality of valve timing, an operation, such as lighting of an alarm lamp (e.g. LED), is carried out at a step S76, followed by terminating the present program.

If the answer to the question of the step S75 is affirmative (Yes), it is determined that a predetermined time period has elapsed after it was detected that the absolute value of difference between the ratio $G_{AIRC}$ and the ideal value 1 has exceeded the tolerance value, and the program proceeds to a step S77, where the valve timing is regarded as abnormal, and at a step S78, operations, such as lighting of an alarm lamp and the failsafe operation described above with reference to FIG. 4, are carried out, followed by terminating the present program.

On the other hand, if the answer to the question of the step S61 is negative (No), i.e. if it is determined that the ECU 5 is supplying a valve-closing instruction signal to the electromagnetic valve 22, processing similar to one carried out at the steps S63 to S66 is carried out. Specifically, it is determined at a step S67 whether or not the value $t_{LVTFS}$ of the $t_{LVTFS}$ delay timer set at the step S63 or at a step S79 is equal to 0. If the answer to this question is affirmative (Yes), i.e. if it is determined that a predetermined time period set for counting by the $t_{LVTFS}$ delay timer has elapsed after the instruction signal for valve timing from the ECU 5 changed from one for high speed valve timing over to one for low speed valve timing, the value $t_{HVTFS}$ of the $t_{HVTFS}$ delay timer is set to a predetermined value (e.g. 2 seconds) at a step 68, and then at a step S69, a theoretical value $G_{AIRLM}$ of the intake air amount to be obtained when the valve timing is set to low speed valve timing is read. The theoretical value $G_{AIRLM}$ is obtained e.g. from a map illustrated in FIG. 6, similarly to $G_{AIRHM}$, as an ideal value to be obtained if the valve timing is set to low speed valve timing. Then the program proceeds to a step S70, where the actual value $G_{AIRS}$ of the intake air amount detected by the intake air amount $G_A$ sensor 9 is read, and then at a step 71, the ratio $G_{AIRC}$ of the theoretical value $G_{AIRLM}$ to the actual value $G_{AIRS}$ is calculated, followed by carrying out the above-described steps S72 et seq.

In addition, if it is determined at the step S62 or S67 that the corresponding value $t_{HVTFS}$ or $t_{LVTFS}$ is not equal to 0, the program proceeds to a corresponding step S79 or S80 to set the value $t_{LVTFS}$ or $t_{HVTFS}$ to a respective predetermined value, followed by terminating the present program.

Thus, failure of the valve timing changeover mechanism can be positively and simply detected by comparing the output signal from the intake air amount $G_A$ sensor provided in the intake pipe 2 and the theoretical value of the intake air amount dependent on the instruction signal supplied to control the valve timing changeover mechanism.

In addition, although in the above embodiment of the invention, only one intake air amount $G_A$ sensor is provided in the intake pipe commonly for all the cylinders, this is not limitative, but a plurality of intake air amount $G_A$ sensors may be provided in the intake pipe manifold for respective cylinders to detect failure of respective valve timing changeover mechanisms of the cylinders. Further, the intake air amount sensor is not limited to the hot-wire type, but other types may be employed.

A second embodiment of the invention will be described below with reference to FIGS. 7 to 12.

Figure 7:
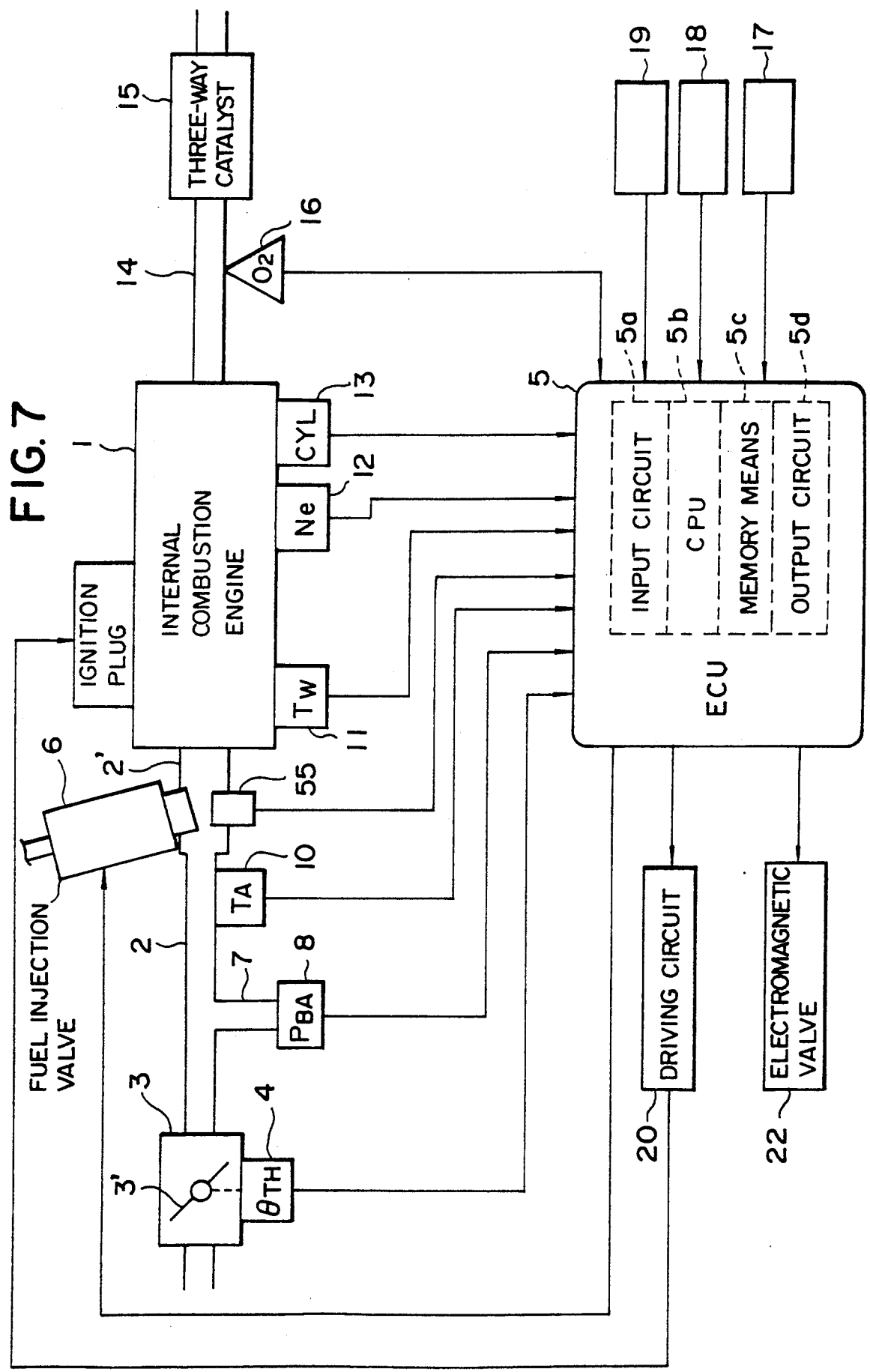
FIG. 7 is a schematic diagram showing the whole arrangement of an internal combustion engine and a control system therefore to which are applied the methods according to second and third embodiments of the invention.

FIG. 7 shows the whole arrangement of a control system similar to that of FIG. 1 to which is applied the failure detecting method according to the second embodiment of the invention. This control system is distinguished from that of FIG. 1 in that in place of the intake air amount sensor 9, manifold absolute pressure sensors 55 are provided in an intake manifold 2' for detecting the absolute pressure ($P_{BAM}$) within the intake manifold 2'. A signal indicative of detected absolute pressure within the intake manifold 2' is supplied to the ECU 5.

Figure 8:
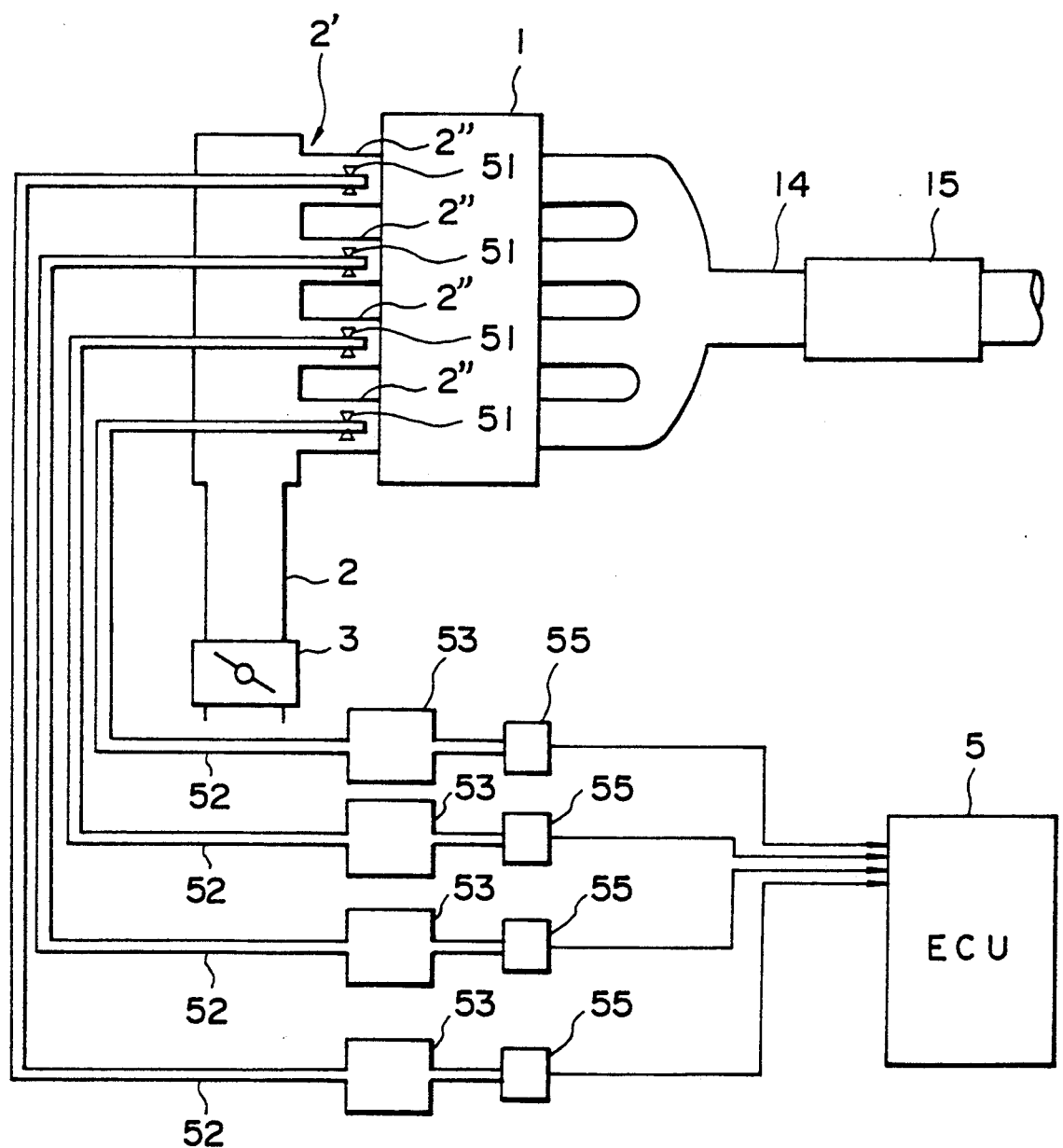
FIG. 8 is a fragmentary enlarged schematic diagram of an intake manifold and manifold absolute pressure sensors 55 in FIG. 7 to which is applied the second embodiment of the invention.
Figure 9:
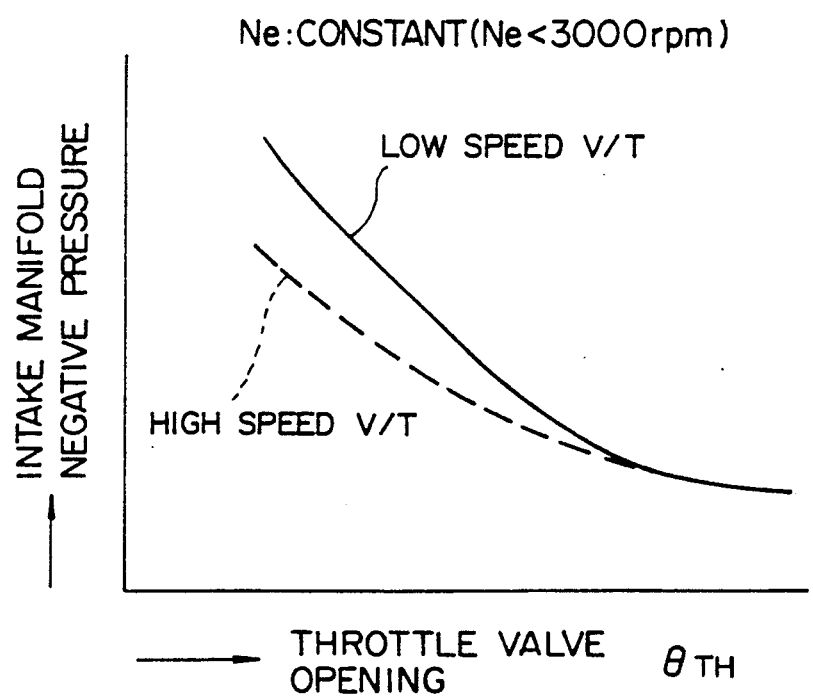
FIG. 9 is a graph showing a difference in the negative pressure within the intake manifold relative to throttle valve opening resulting from different kinds of valve timing selected.

FIG. 8 shows the intake manifold 2' and manifold absolute pressure sensors 55 according to the second embodiment of the invention. In the engine 1, branched pipes 2" of the intake manifold 2' are connected to the respective cylinders. Each branched pipe 2" of the manifold 2' is provided therein with a restriction jet 51 at a location upstream of and in the vicinity of an inlet valve (not shown) of a corresponding cylinder. Each restriction jet 51 is arranged at such a location that the absolute pressure within a corresponding branched pipe 2" is not affected by the absolute pressure within any other branched pipe 2".

Surge tanks 53 are connected to the restriction jets 51 via conduits 52, respectively, and the manifold absolute pressure sensors 55 are connected to the surge tanks 53, respectively. Each manifold absolute pressure sensor 55 detects intake air absolute pressure $P_{BAM}$ in a corresponding branched pipe 2" of the manifold 2' a pulsation factor of which has been damped by a corresponding surge tank 53. With this arrangement, each manifold absolute pressure sensor 55 detects intake air absolute pressure $P_{BAM}$ belonging to a corresponding particular cylinder. On the other hand, the aforementioned intake pipe absolute pressure sensor 8 detects absolute pressure within the intake pipe 2 which is common to all the cylinders. Therefore, the detected intake pipe absolute pressure $P_{BA}$ is equal to a mean value of the values of the manifold absolute pressure $P_{BAM}$ detected by the respective manifold absolute pressure sensors 55.

Next, there will be described with reference to FIGS. 9 to 12 a method for detecting failure of the valve timing changeover mechanism according to the second embodiment of the invention, which is applied to the control system illustrated in FIG. 7 and having the manainfold absolute pressure sensors 55.

In general, in an engine capable of changing valve timing between high speed valve timing (hereinafter referred to as "high speed V/T"), which is suitable for higher engine rotational speeds, and low speed valve timing (hereinafter referred to as "low speed V/T"), which is suitable for lower engine rotational speeds, the negative pressure (hereinafter referred to as "the intake manifold negative pressure") of the intake air at branched pipes 2" of the intake manifold 2' varies depending on whether the valve timing is set to high speed V/T or to low speed V/T even if the throttle valve opening ($\theta_{TH}$) assumes the same value. The difference in the intake manifold negative pressure due to change in the valve timing is larger as the engine rotational speed is lower and as load on the engine is lower. Particularly, the difference is markedly large in an idling region of the engine wherein the intake manifold negative pressure at high speed V/T is much smaller than that at low speed V/T, in other words, the pressure within the intake manifold at high speed V/T is much closer to atmospheric pressure, i.e. the absolute pressure at high speed V/T is much higher than that at low speed V/T (see FIG. 9).

Figure 10:
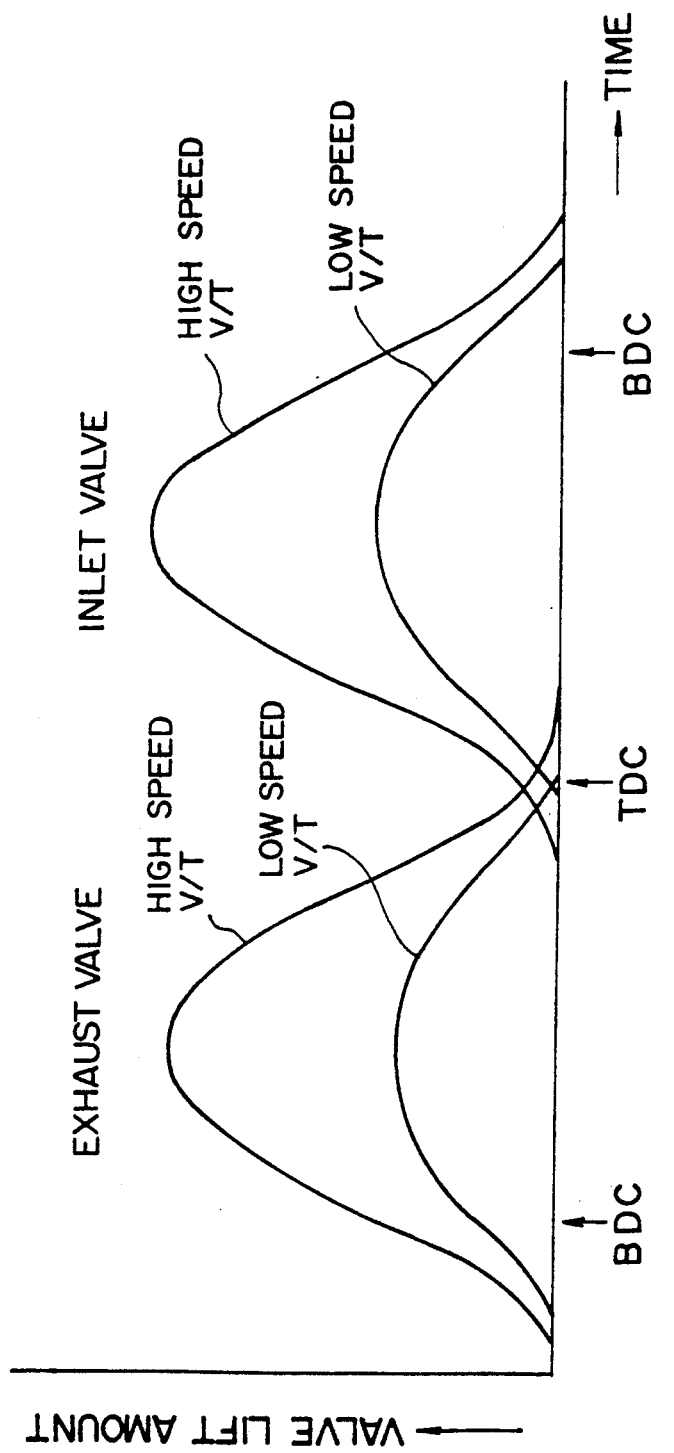
FIG. 10 is a graph showing the relationship between kinds of valve timing selected and lift amounts of inlet and exhaust valves.

The difference in the intake manifold negative pressure between high speed V/T and low speed V/T is caused, as shown in FIG. 10, by difference in the pump efficiency of the cylinders due to difference in the opening angle of inlet and exhaust valves and difference in the overlapping amount of valve opening periods of the inlet and exhaust valves between high speed V/T and low speed V/T. More specifically, the opening angle of an inlet valve is larger at high speed V/T than at low speed V/T, so that the inlet valve remains open for a longer time period after the corresponding piston has passed the bottom dead center (BDC), which results in a greater influence of the compression stroke on the intake manifold negative pressure at high speed V/T. This causes the above-mentioned difference in the intake manifold negative pressure between high speed V/T and low speed V/T.

Therefore, by comparing the intake manifold negative pressure detected for each cylinder during idling of the engine with a predetermined reference value, it is possible to detect failure of the valve timing changeover mechanism (the connection-changeover mechanism 34) being held in the high speed V/T position even when the instruction signal for low speed V/T is supplied to the electromagnetic valve 22.

In addition, as described hereinbefore, each manifold absolute pressure sensor 55 shown in FIG. 8 detects the absolute pressure $P_{BAM}$ (hereinafter referred to as "the intake manifold absolute pressure") within the intake manifold 2' for its corresponding cylinder in such a manner that the detected value of the intake manifold absolute pressure $P_{BAM}$ for the cylinder is free from influence by the absolute pressure for the other cylinders. This is because abnormality in the changeover of the valve timing changeover mechanism occurs in one or more component parts thereof corresponding to a single cylinder (e.g. the changeover pins 36, 37 being incapable of sliding in the rocker arms 31, 33), and hence it is possible to positively detect a change in the absolute pressure due to failure of the valve timing changeover mechanism by detecting the intake manifold absolute pressure $P_{BAM}$ belonging to each cylinder.

If the valve timing changeover mechanism is held in the high speed V/T position in spite of the instruction signal for low speed V/T, during idling of the engine with respect to at least one of the inlet and exhaust valves, the intake manifold negative pressure decreases (the intake manifold absolute pressure increases) as shown in FIGS. 11a to 11c, irrespective of whether the holding in the high speed V/T position occurs in one of the inlet and exhaust valves or in both thereof. Therefore, by setting the aforementioned predetermined reference value, i.e. the threshold value, to a value between the intake manifold negative pressure value assumed during normal operation of the valve timing changeover mechanism and that assumed during high speed V/T holding, it is possible to determine that there occurs high speed V/T holding if the detected intake manifold negative pressure is smaller (the intake manifold absolute pressure is larger) than the threshold value.

Besides the valve timing, factors changing the intake manifold negative pressure can also include ignition timing, idling engine rotational speed, variations in the tappet clearance of the valve-operating device, warming-up of the engine, etc. However, the changes in the intake manifold negative pressure caused by these factors are of the order of 20 to 30 mmHg at the maximum, which is far smaller than the intake manifold negative pressure change due to changeover of valve timing. Therefore, the above-mentioned factors are negligible. However, as shown in FIGS. 11b and 11c, operation of electrical devices, such as headlights, and operation of an air conditioner, of the vehicle, which act as load on the engine, have great influences on change in the intake manifold negative pressure. Therefore, the aforementioned predetermined reference value (the threshold value) has to be set to different values depending on the operating conditions of these devices, which, in operation, act as load on the engine.

Further, since the intake manifold absolute pressure varies with atmospheric pressure, it is necessary to correct the predetermined reference value (the threshold value) in accordance with detected atmospheric pressure.

The method of detecting failure of the valve timing changeover mechanism according to the second embodiment of the invention meets the above requirements, and is further described with reference to a program shown in FIG. 12. This program is executed upon generation of each TDC signal puese and in synchronism therewith.

First, at a step S201, it is determined from the engine rotational speed Ne etc. whether or not the engine is being started, and at a step S202 it is determined whether or not a delaying time period $t_{STDLY}$ (e.g. 5 seconds) has elapsed, which is required before the idling engine rotational speed becomes stable after the start of the engine. In this connection, a $t_{STDLY}$ timer is always reset at a step S203 during the start of the engine. Therefore, if the engine is being started (the answer to the question of the step S201 is affirmative (Yes)) or if the delaying time period $t_{STDLY}$ has not elapsed after the start of the engine (the answer to the question of the step S202 is negative (No)), the present program is immediately terminated.

On the other hand, if the delaying time period $t_{STDLY}$ has elapsed after the start of the engine [the answer to the question of the step S202 is affirmative (Yes)], it is determined at a step S204 whether or not the engine coolant temperature $T_W$ is higher than a predetermined value $T_{WVTFS}$ (e.g. 60° C.), i.e. the warming-up of the engine has been completed. At a step S205, it is determined whether or not the engine rotational speed Ne is lower than a predetermined value $N_{IDL}$ (e.g. 1500 rpm), i.e. the engine is idling. At a step S206, it is determined whether or not the throttle valve opening $\theta_{TH}$ is equal to or smaller than a predetermined value $\theta_{FC}$ which indicates a substantially fully closed state of the throttle valve 3'. Then, at a step S207, it is determined whether or not the ECU 5 is supplying the electromagnetic valve 22 with a valve-closing instruction signal, i.e. an instruction signal for low speed V/T.

If any one of the answers to the questions of the steps S204 to S207 is negative (No), the present program is immediately terminated. On the other hand, if all the answers to the questions of the steps S204 to S207 are affirmative (Yes), i.e. if the engine has been warmed up and is idling with the throttle valve fully closed, while the ECU 5 is supplying the instruction signal for low speed V/T to the electromagnetic valve 22, the program proceeds to a step S208.

At the step S208, a plurality of predetermined reference (threshold) values referred to hereinbefore, i.e. $P_{BVTFS1}$, $P_{BVTFS2}$, and $P_{BVTFS3}$ (absolute pressure), which have been set in advance in accordance with load of the electrical devices on the engine and load of the air conditioner on same during idling of the engine, are corrected in accordance with detected atmosperic pressure.

Then, it is determined at a step S209 whether or not an amount of load on the engine caused by operation of electrical devices is higher than a predetermined value, and at a step S210 whether or not a signal indicative of operation of the air conditioner unit is on. If the amount of electrical load on the engine is not higher than the predetermined value, the program proceeds to a step S211 where the predetermined reference value $P_{BVTFS}$ is set to the value $P_{BVTFS1}$, and if the amount of the electrical load on the engine is higher than the predetermined value, and at the same time the air conditioner is not in operation, the program proceeds to a step S212 where the predetermined reference value $P_{BVTFS}$ is set to the value $P_{BVTFS2}$. Further, if the air conditioner is in operation, the program proceeds to a step S213 where the predetermined reference value $P_{BVTFS}$ is set to the value $P_{BVTFS3}$. The three values (absolute pressure) of the predetermined reference value are set such that $P_{BVTFS1} < P_{BVTFS2} < P_{BVTFS3}$. In other words, the predetermined reference value $P_{BVTFS}$ is set to a larger value as the load on the engine is higher.

Then, it is determined at a step S214 whether or not the intake manifold absolute pressure $P_{BAM}$ detected with respect to a cylinder corresponding to the present TDC signal pulse is equal to or lower than the predetermined reference value $P_{BVTFS}$. If the answer to this question is affirmative (Yes), i.e. if the detected value of the intake manifold absolute pressure $P_{BAM}$ is one to be assumed during low speed V/T, it is determined that the valve timing changeover mechanism is in good order and a $t_{VTFS}$ timer is set to a predetermined time period $t_{VTFS}$ (e.g. 5 seconds) at a step S215, followed by terminating the present program. If the answer to the question of the step S214 is negative (No), it is determined at a step S216 whether or not the remaining time period $t_{VTFS}$ to be counted by the $t_{VTFS}$ timer reset at the step S215 is equal to 0, i.e. the predetermined time period $t_{VTFS}$ has elapsed after the condition of $P_{BAM} > P_{BVTFS}$ came to be satisfied. If the answer to this question is negative, i.e. if the predetermined time period $t_{VTFS}$ has not elapsed, the present program is terminated.

On the other hand, if the answer to the question of the step S216 is affirmative (Yes), i.e. if the predetermined time period $t_{VTFS}$ has elapsed after the condition of $P_{BAM} > P_{BVTFS}$ came to be satisfied, it is determined that the valve timing changeover mechanism is out of order, and the program proceeds to a step S217 where the fail safe operation is carried out. The fail safe operation may be identical to one described in detail hereinbefore with reference to FIGS. 3 and 4 in accordance with the first embodiment of the invention. In other words, an instruction signal for changing the valve timing to low speed V/T is generated and at the same time fuel is supplied to the engine based on the basic fuel amount selected from the $T_{iH}$ map in accordance with high speed V/T when the engine rotational speed is higher then the predetermined value. After the step S217 is executed, the present program is terminated.

Figure 13:
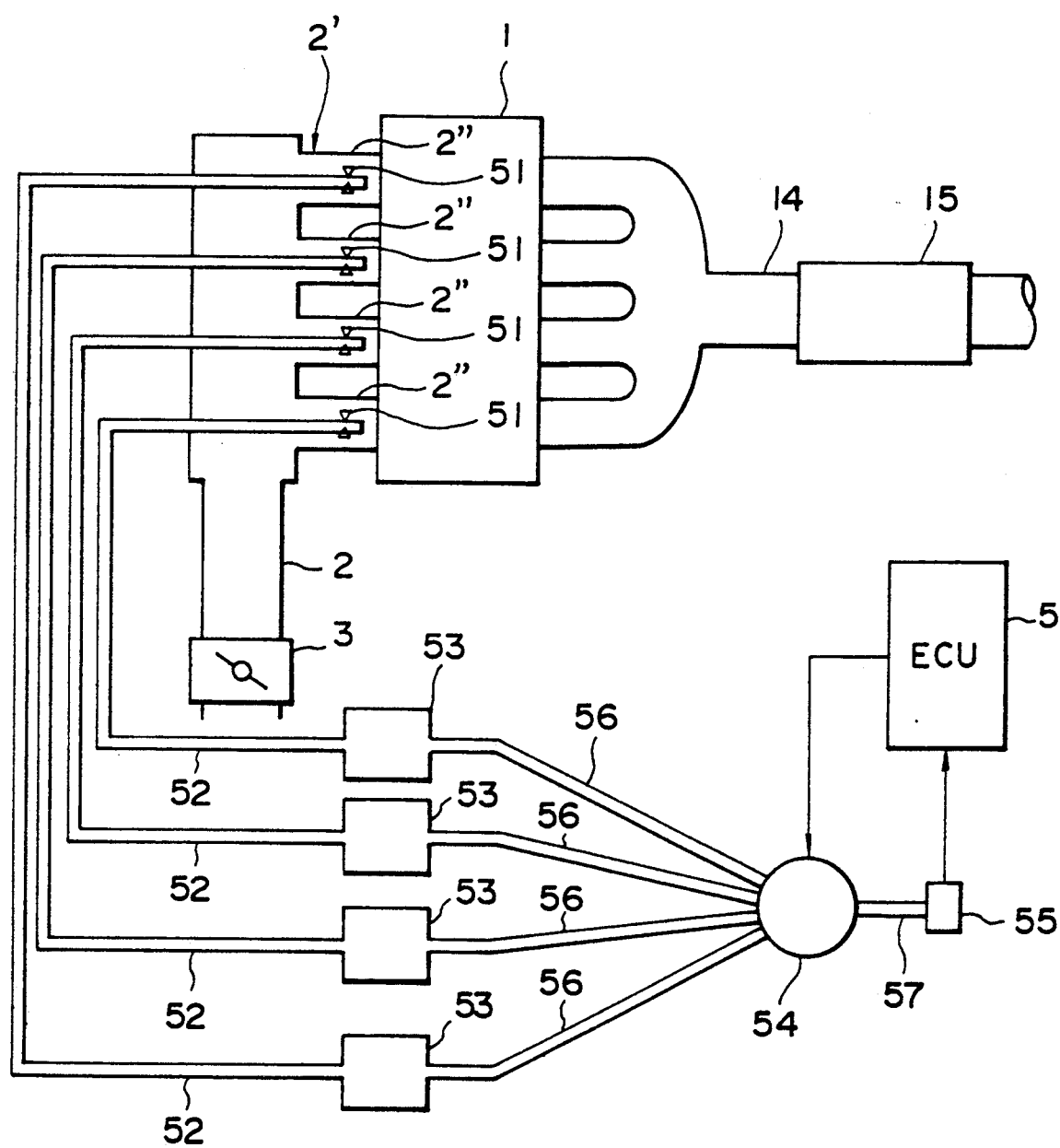
FIG. 13 is a fragmentary enlarged schematic diagram of an intake manifold and a manifold absolute pressure sensor 55 in FIG. 7, to which is applied a third embodiment of the invention.

Next, with reference to FIG. 13, there will described an intake manifold and an intake manifold absolute pressure sensor to which is applied a third embodiment of the invention, which is different in the construction of the intake manifold absolute pressure sensor from those shown in FIG. 8 according to the second embodiment. The arrangement of FIG. 13 may be incorporated into the engine and control system in FIG. 7, in place of the arrangement of FIG. 8.

The arrangement of FIG. 13 is distinguished from that of FIG. 8 in that a rotary valve 54 is connected to the surge tanks 53 via respective conduits 56, and a single manifold absolute pressure sensor 55 is connected to the rotary valve 54 via a conduit 57. Output from the manifold absolute pressure sensor 55 is supplied to the ECU 5, while the ECU 5 supplies a changeover signal for changing the valve position to the rotary valve 54.

The rotary valve 54 is rotated upon each lapse of a predetermined time period, by the changeover signal from the ECU 5 to sequentially connect the manifold absolute pressure sensor 55 with restriction jets 51 and surge tanks 53 to thereby sequentially detect the intake manifold absolute pressure $P_{BAM}$ for respective cylinders.

Next, there will be described with reference to FIG. 14 a method for detecting failure of the valve timing changeover mechanism according to the third embodiment of the invention, which is applied to the control system represented by FIG. 7 and incorporating the intake manifold absolute pressure sensor 55 shown in FIG. 13.

Figure 14B:
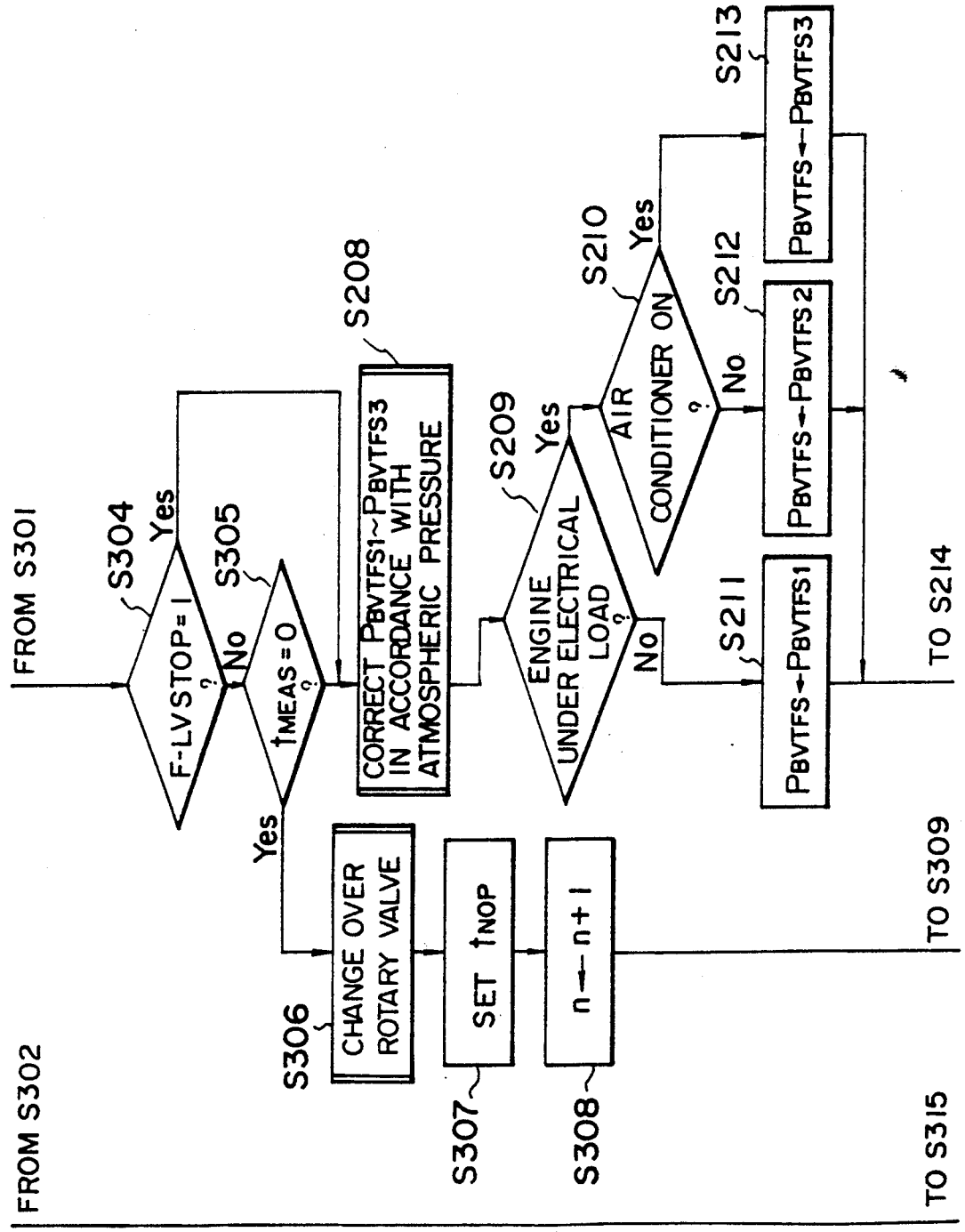
FIG. 14 is a flowchart of a subroutine for detecting failure of the valve timing changeover mechanism which is executed for the control system of FIG. 7 equipped with the manifold absolute pressure sensor 55 of FIG. 13.

Steps in FIG. 14 corresponding to those in FIG. 12 are indicated by identical step numbers. Only the steps which distinguish the method according to the third embodiment from that according to the second embodiment will be described below.

If all the answers to the questions of steps S202 to S207 are affirmative (Yes), i.e. if the predetermined time period $t_{STDLY}$ has elapsed after the start of the engine, the engine has been warmed up and is idling with the throttle valve fully closed, while the ECU 5 is supplying the instruction signal for low speed V/T to the electromagetic valve 22, the program proceeds to a step S301 where it is determined whether or not the remaining time period $t_{NOP}$ to be counted by a $t_{NOP}$ timer which is reset to a predetermined time period $t_{NOP}$ (e.g. 0.5 seconds) at a step S307 referred to hereinbelow is equal to 0. This predetermined time period $t_{NOP}$ is set in consideration of a time period to elapse before the intake meanifold absolute pressure to be detected is stabilized and a time period to elapse before actual changeover of the rotary valve 27 is completed after the instruction signal for the changeover of same has been generated. If the answer to this equestion is negative (No), i.e. if the predetermined time period $t_{NOP}$ has not elapsed, a $t_{MEAS}$ timer is reset to a predetermined time period $t_{MEAS}$ (e.g. 4 seconds) at a step S302, further the $t_{VTFS}$ timer is rset to the predetermined time period $t_{VTFS}$ at a step S315, and a flag F-LVSTOP for cancelling inhibition of changeover operation of the rotary valve 54 is set, at a step S303, to 0, which means that the inhibition of the changeover operation has been cancelled, followed by terminating the present program. In this connection, the predetermined time period $t_{MEAS}$ corresponds to a time interval during which the intake manifold adsolute pressure for each cylinder is supplied to the intake manifold absolute pressure sensor 23.

On the other hand, if the answer to the question of the step S301 is affirmative (Yes), i.e. if the predeteremined time period $t_{NOP}$ has elapsed after the instruction signal for the changeover by rotation of the rotary valve 54 was supplied to same from the ECU 5, it is determined at a step S304 whether or not the flag F-LVSTOP is equal to 1. The flag F-LVSTOP is set to 1 at a step S312 to thereby indicate inhibition of changeover operation of the rotary valve 54. This flag setting is carried out upon occurrence of abnormality, which can be temporary, detected with respect to a valve timing changeover mechanism (connection-changeover mechanism 34) for a cylinder being under abnormality diagnosis. If the answer to this question is affirmative (Yes), i.e. if the flag F-LVSTOP is equal to 1, the program proceeds to a step S208 to continue abnormality diagnosis of the valve timing changeover mechanism being currently under abnormality diagnosis irrespective of the remaining time period $t_{MEAS}$ to be counted by the $t_{MEAS}$ timer. On the other hand, if the answer to this question is negative (No), it is determined at a step S305 whether or not the remaining time period $t_{MEAS}$ of the $t_{MEAS}$ timer reset at the step S302 is equal to 0.

If the answer to this equastion is negative (No), i.e. if the predetermined time peirod $t_{MEAS}$ has not elapsed after completion of changeover operation of the rotary valve 54, the program proceeds to the step S208, whereas if the answer is affirmative (Yes), i.e. if the predetermined time period $t_{MEAS}$ has elapsed, the rotary valve 54 is rotated for changeover at a step S306 to thereby supply the intake manifold absolute pressure for the next cylinder to the intake manifold absolute pressure sensor 55, and the $t_{NOP}$ timer is reset to the predetermined time period $t_{NOP}$ at a step S307.

Then at a step 308, an increment 1 is added to an integer indicative of a cylinder corresponding to a valve timing changeover mechanism to be subjected to abnormality diagnosis next time. At a step S309, it is determined whether or not the resulting integer is larger than 4, which represents the number of cylinders of the engine. If the integer n is larger than 4, it is reset to 1 at a step S310, and then the program proceeds to a step S311, whereas if the integer n is not larger than 4, the program jumps to the step S311, where information specifying the cylinder to be subjected to abnormality diagnosis next time is stored into a backup RAM, followed by the program proceeding to the step S315.

At the step S214, the intake manifold absolute pressure $P_{BAM}$ corresponding to the cylinder, information on which is stored at the step S311 is compared with the predetermined reference value $P_{BVTFS}$. If $P_{BAM} > P_{BVTFS}$, i.e. if it is determined, though temporarily, that the valve timing changeover mechanism (the connection-changeover mechanism 34) is out of order (the answer to the question of the step S214 is negative), and at the same time if the predetermined time period $t_{VTFS}$ has not elapsed after the determination of the failure of the valve timing changeover mechanism, which can be temporary, (the answer to the question of the step S216 is negative), the program proceeds to a step S312 where the flag F-LVSTOP is set to 1, followed by terminating the present program.

If the answer to the question of the step S216 is affirmative (Yes), i.e. if failure occurring in the valve timing changeover mechanism corresponding to the cylinder, information on which is stored at the step S311 has continued over the predetermined time period $t_{VTFS}$ or longer, the step S217 is carried out, and then at a step S313, information specifying the cylinder corresponding to the valve timing changeover mechanism therefor which is determined to be out of order is stored into the backup RAM. The flag F-LVSTOP is set to 0 at a step S314, followed by terminating the present program.

Also after execution of the step S215, the flag F-LVSTOP is set to 0 at a step S316, followed by terminating the present program.

According to the second and third embodiments of the invention, failure of a valve timing changeover mechanism (connection-changeover mechanism 34) is detected by comparing a detected valve of the intake manifold absolute pressure $P_{BAM}$ corresponding to at least one cylinder with the predetermined reference value $P_{BVTFS}$ dependent on the instruction signal for changing the valve timing from the ECU 5. Therefore, the failure of the valve timing changeover mechanism can be positively detected in a simple manner.

Further, failure of the valve timing changeover mechansim can be detected accurately, since in preferred variations of the second and third embodiments of the invention, the detection is carried out during idling of the engine, or the predetermined reference value $P_{BVTFS}$ is set in accordance with the magnitude of electrical load on the engine or in accordance with operation of the air conditioner, or corrected in accordance with detected atmospheric pressure.

Further, according to the third embodiment of the invention, only one intake manifold absolute sensor 55 is used, and the intake manifold absolute pressure $P_{BAM}$ corresponding to each cylinder is connected with intake manifold absolute sensor 55 by way of the rotary valve 54 which is allowed to make changeover after each lapse of a predetermined time period. Therefore, this dispenses with the use of a plurality of intake manifold absolute pressure sensors 55 for respective cylinders of the engine, to thereby simplify the construction for failure detection and hence enable to reduce the manufacturing cost.

What is claimed is:

1. A method of detecting failure of a valve timing changeover control system of an internal combustion engine having at least one inlet valve and at least one exhaust valve, said valve timing changeover control system having changeover means for changing valve timing of said at least one inlet valve, and control means responsive to operating conditions of said engine for supplying a control signal to said changeover means for controlling changeover of the valve timing thereby, comprising the steps of:
   (1) setting a predetermined state of intake air to be supplied to said engine depending on said control signal;
   (2) detecting a state of intake air being supplied to said engine;
   (3) comparing the detected state of intake air with said set predetermined state of intake air; and
   (4) detecting from the result of said comparison whether or not there is failure in said changeover means.

2. A method according to claim 1, wherein said predetermined state of intake air is set in accordance with operating conditions of said engine operating at valve timing dependent on said control signal.

3. A method of detecting failure of a valve timing changeover control system of an internal combustion engine having at least one inlet valve and at least one exhaust valve, said valve timing changeing control system having changeover means for changeover valve timing of said at least one inlet valve, and control means responsive to operating conditions of said engine for supplying a control signal to said changeover means for controlling changeover of the valve timing thereby, comprising the steps of:
   (1) setting a predetermined amount of intake air to be supplied to said engine depending on said control signal;
   (2) detecting an amount of intake air being supplied to said engine;
   (3) comparing the detected amount of intake air with said set predetermined amount of intake air; and
   (4) detecting from the result of said comparison whether or not there is failure in said changeover means.

4. A method according to claim 3, wherein it is determined that there is failure in said changeover means when a state in which difference between said detected amount of intake air and said predetermined amount of intake air set depending on said control signal exceeds a predetermined value has continued over a predetermined time period.

5. A method according to claim 3 or 4, wherein the amount of intake air is detected by means of a hot-wire type intake air amount sensor.

6. A method according to claim 3 or 4, wherein said predetermined amount of intake air is set in accordance with operating conditions of said engine operating at valve timing dependent on said control signal.

7. A method of detecting failure of a valve timing changeover control system of an internal combustion engine having a plurality of cylinders, at least one inlet valve provided for each of said cylinders, and at least one exhaust valve provided for each of said cylinders, said valve timing changeover control system having changeover means for changing valve timing of said at least one inlet valve, and control means respoonsive to operating conditions of said engine for supplying a control signal to said changeover means for controlling changeover of the valve timing thereby, comprising the steps of:
   (1) setting a predetermined pressure level of intake air to be supplied to said engine depending on said control signal;
   (2) detecting a pressure level of intake air being supplied to said engine at a location upstream of said at least one inlet valve corresponding to at least one of said cylinders;
   (3) comparing the detected pressure level of intake air with said set predetermined pressure level of intake air; and
   (4) detecting from the result of said comparison whether or not there is failure in said changeover means.

8. A method according to claim 7, wherein said detection of failure of said changeover means is carried out during idling of said engine.

9. A method according to claim 7 or 8, wherein said detection of failure of said changeover means is carried out when said control signal gives an instruction for operation of said engine at valve timing for lower engine rotational speeds.

10. A method according to claim 9, wherein said pressure level of intake air is detected in terms of absolute pressure of intake air, and it is determined that there is failure in said changeover means when the detected level of absolute pressure of intake air is higher than said predetermined pressure level of intake air.

11. A method according to claim 7 or 8, wherein said predetermined pressure level of intake air is set depending on electrical load acting on said engine.

12. A method according to claim 7 or 8, wherein said predetermined pressure level of intake air is set depending on a state of operation of an air conditioner driven by said engine.

13. A method according to claim 7 or 8, wherein said predetermined pressure level is corrected depending on atmospheric pressure.

14. A method according to claim 7 or 8, wherein said pressure level of intake air is detected by means of a plurality of pressure-detecting means provided respectively for said cylinders.

15. A method according to claim 7 or 8, wherein said pressure level of intake air is detected by means of signal pressure-detecting means, said pressure level of intake air upstream of said inlet valves corresponding respectively to said cylinders being sequentially connected to said single pressure-detecting means by rotary changeover means upon each lapse of a predetermined time period.

* * * * *

UNITED STATES PATENT AND TRADEMARK OFFICE
CERTIFICATE OF CORRECTION

PATENT NO. : 5,033,290
DATED : July 23, 1991
INVENTOR(S) : SEKI et al.

It is certified that error appears in the above-identified patent and that said Letters Patent is hereby corrected as shown below:

Title page, in the Abstract:

Second line from the bottom, change "combustion" to -- comparison --.

Claim 3, column 21, line 48, change "changeing" to -- changeover --.

Claim 3, column 21, line 49, change "changeover" to -- changing --.

Claim 7, column 22, line 16, change "respoonsive" to -- responsive --.

Claim 15, column 22, line 61, change "signal" to -- single --.

Signed and Sealed this

Twenty-first Day of September, 1993

Attest:

BRUCE LEHMAN

Attesting Officer

Commissioner of Patents and Trademarks